United States Patent [19]
Mizushima et al.

[11] Patent Number: 5,627,667
[45] Date of Patent: May 6, 1997

[54] LIQUID CRYSTAL DISPLAY APPARATUS, A METHOD FOR PRODUCING THE SAME, AND A SUBSTRATE

[75] Inventors: Shigeaki Mizushima, Ikoma; Kazuyuki Aburazaki, Tenri; Noriko Watanabe, Nara; Mitsuaki Hirata, Tenri; Hiroko Iwagoe, Yamatokoriyama; Tomoko Okamura, Funabashi, all of Japan

[73] Assignee: Sharp Kabushiki Kaisha, Japan

[21] Appl. No.: 449,740

[22] Filed: May 25, 1995

Related U.S. Application Data

[62] Division of Ser. No. 187,547, Jan. 28, 1994.

[30] Foreign Application Priority Data

| Jan. 29, 1993 | [JP] | Japan | 5-14177 |
| Jun. 4, 1993 | [JP] | Japan | 5-134983 |
| Jul. 22, 1993 | [JP] | Japan | 5-181738 |
| Jul. 30, 1993 | [JP] | Japan | 190499 |
| Aug. 27, 1993 | [JP] | Japan | 523229 |

[51] Int. Cl.⁶ .................................................. G02F 1/1337
[52] U.S. Cl. ..................................... 349/124; 349/132
[58] Field of Search ................................. 359/75, 76, 77, 359/78

[56] References Cited

U.S. PATENT DOCUMENTS

| 3,854,793 | 12/1974 | Kahn | 350/160 |
| 3,947,185 | 3/1976 | Maezawa | 350/160 |
| 3,967,883 | 7/1976 | Meyerhofer et al. | 350/160 |
| 4,247,174 | 1/1981 | Walter | 350/34 |
| 4,252,415 | 2/1981 | Klein et al. | 350/343 |

(List continued on next page.)

FOREIGN PATENT DOCUMENTS

| 421190 | 4/1991 | European Pat. Off. . |
| 549283 | 6/1993 | European Pat. Off. . |
| 56-146119 | 11/1981 | Japan | 359/78 |
| 58-139124 | 8/1983 | Japan . |
| 60-95423 | 5/1985 | Japan . |
| 60-136716 | 7/1985 | Japan . |
| 60-217341 | 10/1985 | Japan | 359/76 |
| 61-249021 | 11/1986 | Japan . |
| 62-144133 | 6/1987 | Japan . |
| 1079725 | 3/1989 | Japan . |
| 1120531 | 5/1989 | Japan . |
| 1120533 | 5/1989 | Japan . |
| 1169428 | 7/1989 | Japan . |
| 1204025 | 8/1989 | Japan . |
| 1245223 | 8/1989 | Japan . |
| 1210932 | 8/1989 | Japan . |
| 2055330 | 2/1990 | Japan . |
| 412314 | 1/1992 | Japan . |
| 5005886 | 1/1993 | Japan . |
| 5188374 | 7/1993 | Japan . |
| 5173136 | 7/1993 | Japan | 359/78 |
| 5173135 | 7/1993 | Japan | 359/78 |
| 5173137 | 7/1993 | Japan | 359/78 |
| 5203951 | 8/1993 | Japan . |
| 524210 | 9/1993 | Japan | 359/75 |
| 5303099 | 11/1993 | Japan . |

OTHER PUBLICATIONS

"A Complementary TN LCD with Wide-Viewing-Angle Grayscale", Takatori et al., *Japan Display*, '92, Oct. 1992, pp. 591–594.

"Wide Viewing Angle Full-Color TFT LCDs", Kamada et al., *Japan Display*, '92, Oct. 1992, p. 886.

(List continued on next page.)

*Primary Examiner*—William L. Sikes
*Assistant Examiner*—James A. Dudek

[57] ABSTRACT

A method for producing a liquid crystal display apparatus, including a pair of substrates with a liquid crystal layer interposed therebetween, includes forming an aligning film on at least one of the pair of substrates. The surface of the aligning film is made rough to adjust the pretilt angles of liquid crystal molecules in the liquid crystal layer which are adjacent the aligning film. Further, the degrees of roughness are different among a plurality of prescribed regions.

20 Claims, 19 Drawing Sheets

U.S. PATENT DOCUMENTS

| | | | |
|---|---|---|---|
| 4,796,979 | 1/1989 | Tsubayama | 359/77 |
| 4,840,460 | 6/1989 | Bernot et al. | |
| 4,878,742 | 11/1989 | Ohkubo et al. | 350/347 |
| 4,930,876 | 6/1990 | Suzuki et al. | 359/88 |
| 5,071,228 | 12/1991 | Waldmann et al. | 359/63 |
| 5,073,294 | 12/1991 | Shannon et al. | 252/299.01 |
| 5,172,255 | 12/1992 | Brosig et al. | |
| 5,189,540 | 2/1993 | Nakamura et al. | 359/102 |
| 5,198,917 | 3/1993 | Togashi | 359/76 |
| 5,223,963 | 6/1993 | Okada et al. | 359/76 |
| 5,231,039 | 7/1993 | Sakono et al. | 437/41 |
| 5,280,375 | 1/1994 | Tsuda et al. | 359/78 |
| 5,303,076 | 4/1994 | Okada et al. | 359/78 |
| 5,309,264 | 5/1994 | Lien et al. | 359/77 |
| 5,321,537 | 6/1994 | Okada et al. | 359/78 |
| 5,398,127 | 3/1995 | Kubota et al. | 359/75 |
| 5,416,619 | 5/1995 | Koike | 359/57 |
| 5,438,421 | 8/1995 | Sugawara et al. | 359/76 |
| 5,453,862 | 9/1995 | Toko et al. | 359/76 |
| 5,473,455 | 12/1995 | Koike et al. | 359/76 |
| 5,495,355 | 2/1996 | Konuma | 359/78 |

OTHER PUBLICATIONS

"Late–News Paper: A Full–Color TFT–LCD with A Domain–Divided Twisted–Nematic Structure", Koike et al., SID 92 Digest, pp. 798–801.

"Controlled Two–and Four–Domain Twisted Nematic Liquid Crystal Displays" IBM Technical Disclosure Bulletin, vol. 33, No. 1B, Jun. 1990, New York, pp. 199–200.

"Two–Domain 80–twisted Nematic Liquid Crystal Display for Grayscale Applications", Japanese Journal of Applied Physics, vol. 31, No. 11B, Nov. 1992, Tokyo, Japan, pp. L1603–1605.

"Bi–Handedness Two–Domain Twist Nematic Cell for Active Matrix Display Application", IBM Technical Disclosure Bulletin, vol. 36, No. 8, Aug. 1993, pp. 485, 486.

LIQUID CRYSTAL DISPLAY APPARATUS, A METHOD FOR PRODUCING THE SAME, AND A SUBSTRATE

This application is a divisional of copending application Ser. No. 08/187,547, filed on Jan. 28, 1994, the entire contents of which are hereby incorporated by reference.

BACKGROUND OF THE INVENTION

1. Field of the Invention

The present invention relates to a liquid crystal display apparatus with a wide viewing angle and a method for producing the same, and also relates to a substrate.

2. Description of the Related Art

In a liquid crystal display (LCD), a liquid crystal layer including liquid crystal molecules is provided between a pair of substrates. When the alignment of the liquid crystal molecules is changed, the optical refractive index of the liquid crystal layer is also changed. By utilizing the change in the refractive index, the LCD performs the display. Accordingly, it is important that the liquid crystal molecules are arranged as regularly as possible in the initial state. In order to regularly arrange the liquid crystal molecules in the initial state, the surface conditions of the substrates which sandwich the liquid crystal layer should regulate the interactions between the liquid crystal molecules and the surfaces.

In the method for performing such a regulation which is currently the most widely used, material for a liquid crystal aligning film is applied to each of the surfaces of the substrates which face the liquid crystal layer. The applied material is dried and cured, so as to form the aligning film. Thereafter, the surface of the aligning film is rubbed.

There are two types of aligning films for regulating the alignment of the liquid crystal, i.e., an inorganic aligning film and an organic aligning film. Materials for the inorganic aligning film include oxides, inorganic silane, metals, and metal complexes, whereas materials for the organic aligning film include polyimides. A typical material for the liquid crystal aligning film which is currently employed is a polyimide resin. The polyimide resin is produced in the following manner. A polyamic acid, which is a precursor for all aromatic polyimides (all aromatic PI), is first applied to a substrate. Then, the substrate with the polyamic acid is heated so that an imidization reaction is caused to occur. As a result, the polyamic acid is converted into a polyimide resin. The reasons why the polyimide resin is widely used for the liquid crystal aligning film material are the concentration and the viscosity thereof can easily be adjusted since the polyamic acid has a good solubility, the polyimide resin has a good applicability, and that the thickness of the polyimide resin film can be easily controlled. The produced polyimide resin is more stable in terms of energy than the polyamic acid. Accordingly, when the substrate with the polyimide resin is cleaned by water, the reversible reaction will not occur.

The polyimide film which is formed on the substrate in the above-described manner is unidirectionally rubbed with a burnishing cloth or the like. Thus, the liquid crystal molecules can be aligned in the rubbing direction. The rubbing treatment is unidirectionally performed on the substrate, so that the tilt angles (i.e., pretilt angles) of the liquid crystal molecules in the liquid crystal layer which are in contact with the aligning film are all equal to each other. Accordingly, in each picture element constituting a dot as a unit of a matrix-type display pattern, all the pretilt angles are substantially equal to each other and are aligned in one direction.

In an active matrix type LCD which uses thin film transistors as switching elements connected to respective pixel electrodes constituting picture elements of the display pattern, that is, in a TFT-LCD, a construction of a twisted nematic (TN) type liquid crystal layer is adopted (an LCD of the TN mode). In such an LCD of the TN mode, the liquid crystal molecules between the pair of substrates are continuously twisted by 90° along the direction perpendicular to the surfaces of the substrates. The viewing angle characteristics of the LCD define the optimal viewing angle direction and the viewing angle range depending on the directions of the liquid crystal molecules in the liquid crystal layer (the aligning directions and the tilt angles).

FIG. 27 shows a cross section of a picture element portion of an exemplary TN type LCD. The LCD is a TFT-LCD of an active matrix type. As is shown in FIG. 27, a liquid crystal layer 133 is sandwiched between substrates 131 and 132 which are provided so as to face each other. FIG. 26 is a plan view of the substrate 131 in FIG. 27. In the substrate 131, scanning lines 112 and signal lines 113 are formed so as to cross each other on a glass substrate 131a. In the vicinity of the crossings of the scanning lines 112 and the signal lines 113, thin film transistors (TFTs) 120 as nonlinear elements having switching function are formed. In areas defined by the scanning lines 112 and the signal lines 113, pixel electrodes 110 are formed, respectively. Each of the TFTs 120 includes a gate electrode 115 which is branched from a scanning line 112, a source electrode 116 which is branched from a signal line 113, and a drain electrode 117 for connecting the TFT 120 to a pixel electrode 110. The reference numeral 118 denotes an additional capacitance.

Over the above elements, as is shown in FIG. 27, an insulating protective film 131d and an aligning film 131e are formed in this order. In the other substrate 132, a color filter 132b, a transparent electrode 132c, an insulating protective film (not shown), and an aligning film 132e are formed on a glass substrate 132a in this order.

A liquid crystal molecule 133a in the liquid crystal layer 133 which is sandwiched by the above-mentioned substrates 131 and 132 is tilted as shown in FIG. 27, and the inclination represents the aligning direction of the liquid crystal. The substrates 131 and 132 are sealed at their ends by a resin or the like (not shown), and a peripheral circuit or the like for driving the liquid crystal is externally mounted. LCDs which are of types other than the active matrix type have the same construction as described above.

In the TN type LCD, since the liquid crystal molecule has anisotropy in the refractive index (birefringence), the contrast depends on the viewing angle at which a person (a viewer) views the LCD. In general, in the normally white mode of LCD in which light is transmitted during the no voltage application so as to perform a white display, when the LCD is viewed in the direction perpendicular to the surfaces of the substrates in a state where a voltage is applied across the electrodes formed in the respective substrates which sandwich the liquid crystal layer, the transmittance of light is decreased as the applied voltage value becomes high, as is shown by solid line L1 in FIG. 28. When the voltage value is saturated, the transmittance becomes substantially equal to zero. Accordingly, even when a much higher voltage is applied, the transmittance remains at substantially zero.

When the viewing angle is inclined from the direction perpendicular to the substrate face to the positive viewing angle direction, the applied voltage to transmittance characteristics are varied as is shown by the solid line L2 in FIG.

28. Specifically, as the applied voltage becomes high, the transmittance is decreased to some extent. When the applied voltage exceeds a specific value, the transmittance is increased. Then, the transmittance is gradually decreased. Therefore, when the viewing angle is inclined in the positive viewing angle direction, there occurs a phenomenon in that the black and the white (the negative and positive) of the image are reversed at a specific angle. This phenomenon occurs because the liquid crystal molecule in the liquid crystal layer has the tilt angle, and the refractive index is varied depending on the viewing angle. This phenomenon causes a serious problem for a person viewing the image.

Referring to FIG. 29, the problem will be described in detail. As is shown in FIG. 29(a), when the applied voltage is zero or a relatively lower voltage, the center molecule 133a of the liquid crystal layer is observed in the form of an ellipse by the viewer 137 positioned in the positive viewing angle direction. As the applied voltage is gradually increased, the center molecule 133a is moved in such a manner that the longer axis becomes aligned along the direction of the electric field, i.e., the direction perpendicular to the substrate face. Accordingly, the center molecule 133a is momentarily observed in the form of a circle by the viewer 137, as is shown in FIG. 29(b). As the voltage is further increased, the center molecule 133a becomes substantially parallel to the electric field direction. As a result, the center molecule 133a is observed again in the form of an ellipse by the viewer 137, as is shown in FIG. 29(c). In this way, the reverse phenomenon occurs.

If the viewing angle is tilted in the negative viewing angle direction, the variation of the light transmittance is relatively small, as is shown by the solid line L3 in FIG. 28. As a result, the contrast is greatly degraded.

The above-described reverse phenomenon in the positive viewing angle direction and the degradation of contrast in the negative viewing angle direction cause serious problems for the viewer, and they result in doubts about the display properties of the LCD.

A technique for suppressing the reverse phenomenon in the TN mode LCD is described in, for example, Japanese Laid-Open Patent Publication No. 2-12. According to the technique, in the active matrix type LCD, a display electrode constituting a picture element is divided into an inner electrode and an outer electrode. By changing the conditions of the electric field applied to the liquid crystal molecules on the inner electrode side from those of the electric field applied to the liquid crystal molecules on the outer electrode side an attempt to improve the viewing angle characteristics was made.

However, the technique disadvantageously necessitates a variety of the electrode patterns, so that the production process and the driving method become complicated. Moreover, the resulting improvement of the viewing angle characteritics is not considered as being remarkable.

JAPAN DISPLAY '92, pages 591–594, and page 886 describe the following two methods. In one method, the surface of the aligning film is unidirectionally rubbed, and then a resist is deposited on a part of the aligning film. Then, the rubbing is performed in the direction reverse to the previous rubbing direction. Thereafter, the resist is removed. As a result, the aligning film is provided with different aligning conditions caused by the different rubbing directions between the aligning film surface covered with the resist and the aligning film surface not covered with the resist, so as to differentiate the pretilt angles. In the other method, polyimide aligning films made of different materials are Juxtaposed and then they are subjected to the rubbing treatment. As a result, a plurality of pretilt angles are formed on the aligning films depending on the materials thereof.

However, if the resist is deposited on the surface of the aligning film, the alignment regulating property of the aligning film surface is greatly deteriorated. In the method for forming the polyimide aligning films of different materials, the patterning of the aligning films requires complicated process steps. For these reasons, the above methods are not practical.

In another attempt to eliminate the reverse phenomenon in the positive viewing angle direction and the contrast degradation in the negative viewing angle direction, a rectangular region 119, in which the aligning direction of liquid crystals is different from that in the other region, is formed in part of the picture element shown by a dotted line in FIG. 26. In more detail, both the regions of positive viewing angle and negative viewing angle are formed in one picture element, so that the contrast degradation in the negative viewing angle is compensated, and the reverse phenomenon in the positive viewing angle is suppressed.

However, in the above method, as the time elapses, the aligning condition of the rectangular region formed in part of the picture element may be absorbed by the aligning condition of the other region. In addition, in the boundary area between the rectangular region and the other region (an area indicated by dimension line C in FIG. 27), a disclination line occurs, i.e., the liquid crystals cannot be driven by the influence of both aligning conditions. This causes the contrast to be degraded.

SUMMARY OF THE INVENTION

The liquid crystal display apparatus of this invention has a pair of substrates with a liquid crystal layer interposed therebetween. In the apparatus, an aligning film is formed on at least one of the pair of substrates, the surface of the aligning film is made rough for controlling pretilt angles of liquid crystal molecules in the liquid crystal layer which are in contact with the surface of the aligning film, and the degrees of roughness are different among a plurality of prescribed regions.

In one embodiment of the invention, the pretilt angle is set to be small in a region of the surface of the aligning film with a higher degree of roughness, and the pretilt angle is set to be large in a region of the surface of the aligning film with a lower degree of roughness.

In another embodiment of the invention, among the plurality of regions with different degrees of roughness, at least two or more regions respectively have different viewing angle characteristics.

In another embodiment of the invention, an underlying film is formed between the aligning film and the substrate on which the aligning film is formed, the surface of the underlying film which is in contact with the aligning film is made rough, and the degrees of roughness are different among a plurality of prescribed regions.

In another embodiment of the invention, the pretilt angle is set to be small in a region of the surface of the aligning film with a higher degree of roughness, and the pretilt angle is set to be large in a region of the surface of the aligning film with a lower degree of roughness.

In another embodiment of the invention, among the plurality of regions with different degrees of roughness, at least two or more regions respectively have different viewing angle characteristics.

In another embodiment of the invention, the aligning film formed to cover the underlying film has different thicknesses in various portions.

According to another aspect of the invention, a method for producing a liquid crystal display apparatus having a pair of substrates with a liquid crystal layer interposed therebetween and having picture elements disposed in a matrix is provided. The method includes the steps of: forming a film to be an aligning film for controlling the alignment of liquid crystal molecules in the liquid crystal layer, on at least one of the pair of substrates; and irradiating the film with light to control the pretilt angles of liquid crystal molecules, and providing an aligning property to the film.

In one embodiment of the invention, desired regions of the film are selectively irradiated with the light, the pretilt angles are set to be different between an irradiated region and a non-irradiated region, and the aligning property is provided by rubbing.

In another embodiment of the invention, the irradiated region or the non-irradiated region corresponds to each of the picture elements.

In another embodiment of the invention, the irradiated region is formed by light irradiation with different light intensities between picture elements.

In another embodiment of the invention, both the irradiated region and the non-irradiated region exist in one picture element by the light irradiation.

In another embodiment of the invention, the light intensity for the irradiated region in one picture element is made different in the light irradiation.

In another embodiment of the invention, the method further includes the steps of: forming films to be aligning films on both of the pair of substrates; and irradiating at least one of the films by which the pretilt angle is controlled.

In another embodiment of the invention, a mask or light converging means is used for selectively irradiating the film with light.

In another embodiment of the invention, the film is made of an organic polymer.

In another embodiment of the invention, for the organic polymer film, a material containing polyimide, polyamide, polystyrene, polyamideimide, epoxyacrylate, spiranacrylate, or polyurethane as a main component.

In another embodiment of the invention, one of an inorganic oxide film, an inorganic nitride film, an inorganic fluoride film, and a metal film is formed as the film.

In another embodiment of the invention, ultraviolet rays, visible rays, or infrared rays, or laser beams having a wavelength corresponding to the rays is used for the light.

In another embodiment of the invention, the light is ultraviolet rays or laser beams having a wavelength corresponding to the rays.

According to another aspect of the invention, a method for producing a liquid crystal display apparatus having a pair of substrates with a liquid crystal layer interposed therebetween and having picture elements disposed in a matrix is provided. The method includes the steps of: forming a film to be an aligning film for controlling the alignment of liquid crystal molecules in the liquid crystal layer, on at least one of the pair of substrates; performing a first surface treatment for providing an aligning direction of liquid crystal molecules in the liquid crystal layer to the film; and performing a second surface treatment to make a part of the film rough for determining the pretilt angle of liquid crystal molecules in the liquid crystal layer.

In one embodiment of the invention, the second surface treatment is selectively performed by regarding one picture element as a unit.

In another embodiment of the invention, the second surface treatment is performed to differentiate the degrees of roughness between picture elements.

In another embodiment of the invention, the second surface treatment is selectively performed for a plurality of portions in one picture element.

In another embodiment of the invention, the second surface treatment is performed to differentiate the degrees of roughness between the plurality of portions in one picture element.

In another embodiment of the invention, the second surface treatment is performed to bring the surface of the film into contact with a solution containing one of an acid or alkali as a main component.

In another embodiment of the invention, the second surface treatment is performed to bring the surface of the film into contact with one of a reaction gas or a gas in plasma phase.

According to another aspect of the invention, a method for producing a liquid crystal display apparatus having a pair of substrates with a liquid crystal layer interposed therebetween and having picture elements disposed in a matrix is provided. The method includes the steps of: forming an underlying film on at least one of the pair of substrates; making the surface of the underlying film rough; forming a film to be an aligning film for controlling the alignment of liquid crystal molecules in the liquid crystal layer to cover the underlying film, and transferring the roughness to the film to provide the roughness for determining the pretilt angle of liquid crystal molecules in the liquid crystal layer to the film; and applying the aligning direction of liquid crystal molecules in the liquid crystal layer to the film.

In one embodiment of the invention, the step of making the underlying film rough includes: a first step of making the surface of the underlying film rough; a step of selectively forming a resist pattern on a region of the underlying film which is made rough; a second step of making the surface of the underlying film in a region which is not covered with the resist pattern in the region which is made rough in the first step; and a step of removing the resist pattern on the underlying film.

In another embodiment of the invention, the step of making the underlying film rough includes: a first step of making the surface of the underlying film rough; and a step of selectively forming an insulating film on a region of the underlying film which is made rough, to cause the surface of the insulating film to be rough.

In another embodiment of the invention, the step of making the underlying film rough includes: a step of forming the underlying film of different materials for respective prescribed regions on the substrate; and a step of making the surfaces of the regions rough differently from each other.

In another embodiment of the invention, the step of making the underlying film rough is selectively performed for respective picture elements.

In another embodiment of the invention, the degrees of roughness are made different for respective picture elements.

In another embodiment of the invention, the step of making the underlying film rough is selectively performed for a plurality of portions in one picture element.

In another embodiment of the invention, the degrees of roughness are made different for respective plurality of portions in one picture element.

In another embodiment of the invention, the film is made of an organic polymer.

In another embodiment of the invention, for the organic polymer film, a material containing polyimide, polyamide, polystyrene, polyamideimide, epoxyacrylate, spiranacrylate, or polyurethane as a main component.

According to another aspect of the invention, a substrate which faces another substrate with a liquid crystal layer interposed therebetween is provided. In the substrate, a transparent electrode is formed on its surface, an aligning film is formed on a portion of the transparent electrode, and the other portion has no aligning film formed thereon.

According to another aspect of the invention, a liquid crystal display apparatus includes a pair of substrates which face each other with a liquid crystal layer interposed therebetween, each of the substrates having a transparent electrode formed thereon and an aligning film formed on a surface thereof which faces the liquid crystal layer. In the apparatus, the transparent electrode is formed on the surface of the substrate, the aligning film is formed on a portion of the transparent electrode, and the other portion has no aligning film formed thereon.

In one embodiment of the invention, the surface of the portion of the transparent electrode having no aligning film thereon and the surface of the aligning film are subjected to different aligning treatments.

In another embodiment of the invention, the surface of the aligning film is subjected to a rubbing treatment, and the surface of the portion of the transparent electrode having no aligning film thereon is not subjected to the rubbing treatment.

In another embodiment of the invention, one of each portion of the transparent electrode having the aligning film thereon and each portion having no aligning film is provided in a corresponding manner to one picture element, or wherein one of each portion having the aligning film and each portion having no aligning film is provided in a corresponding manner to one of two or more divisions obtained by dividing one picture element.

In another embodiment of the invention, the substrates oppose each other so that the portion having the aligning film on one substrate faces the portion having no aligning film on the other substrate.

In another embodiment of the invention, the aligning film is an organic polymer film made of polyimide, polyamide, polystyrene, polyamideimide, epoxyacrylate, spiranacrylate, or polyurethane.

In another embodiment of the invention, liquid crystal layer regions which are in contact with respective aligning film regions with different degrees of roughness include different aligning directions, the liquid crystal layer regions with different aligning directions exist in each picture element, and wherein the boundary between one of the liquid crystal layer regions and the adjacent liquid crystal layer region is set continuously over two or more picture elements.

In another embodiment of the invention, liquid crystal layer regions which are in contact with respective aligning film regions with different degrees of roughness include different aligning directions, the liquid crystal layer regions with different aligning directions exist in each picture element, and wherein the boundary between one of the liquid crystal layer regions and the adjacent liquid crystal layer region is set to be parallel with the aligning direction of liquid crystals which are in contact with one of the pair of substrates.

In another embodiment of the invention, signal lines are disposed in the vicinity of the respective picture elements, the signal lines are connected to the picture elements via nonlinear elements, and the positions of the nonlinear elements and the aligning directions in the regions with different aligning directions are determined to set the boundary to be most distant from the nonlinear elements.

In another embodiment of the invention, liquid crystal layer regions which are in contact with respective aligning film regions with different degrees of roughness include different aligning directions, the liquid crystal layer regions with different aligning directions exist in each picture element, and wherein the boundary between one of the liquid crystal layer regions and the adjacent liquid crystal layer region is covered with a light blocking film.

In another embodiment of the invention, liquid crystal layer regions which are in contact with the portion having the aligning film and the portion having no aligning film include different aligning directions, respectively, the liquid crystal layer regions with different aligning directions exist in each picture element, and wherein the boundary between one of the liquid crystal layer regions and the adjacent liquid crystal layer region is set continuously over two or more picture elements.

In another embodiment of the invention, liquid crystal layer regions which are in contact with the portion having the aligning film and the portion having no aligning film include different aligning directions, respectively, the liquid crystal layer regions with different aligning directions exist in each picture element, and wherein the boundary between one of the liquid crystal layer regions and the adjacent liquid crystal layer region is set to be parallel with the aligning direction of liquid crystals which are in contact with one of the pair of substrates.

In another embodiment of the invention, signal lines are disposed in the vicinity of the respective picture elements, the signal lines are connected to the picture elements via nonlinear elements, and the positions of the nonlinear elements and the aligning directions in the regions with different aligning directions are determined to set the boundary to be farthest from the nonlinear elements.

In another embodiment of the invention, liquid crystal layer regions which are in contact with the portion having the aligning film and the portion having no aligning film include different aligning directions, respectively, the liquid crystal layer regions with different aligning directions exist in each picture element, and wherein the boundary between one of the liquid crystal layer regions and the adjacent liquid crystal layer region is covered with a light blocking film.

In another embodiment of the invention, the boundary is covered with a light blocking film.

In another embodiment of the invention, a nonlinear element is connected to each of the picture elements, and the light blocking film is made of the same material as that for a non-transparent layer constituting the nonlinear element.

In the LCD according to the invention, the aligning film formed on the substrate surface has a plurality of prescribed regions with various aligning conditions. The various aligning conditions are caused by the roughness of the aligning film surface. In accordance with the roughness of the aligning film surface, the inclinations, i.e., the pretilt angles of the liquid crystals in the liquid crystal layer which are in contact with the aligning film surface are determined. Therefore, if the degree of the roughness is varied for the prescribed regions, the pretilt angles in the liquid crystal layer are also changed for the prescribed regions. In the case where the roughness is large, as is shown in FIG. 30(a), there is a large difference between the pretilt angles of the liquid crystal molecules in contact with the aligning film surface and those remote from the aligning film surface, so that a dynamic control of liquid crystal molecules can be performed. FIG. 30(b) shows the influence of the roughness on the pretilt angles in the liquid crystal layer direction in the case where the roughness is small.

As described above, a plurality of regions with different pretilt angles are formed in one and the same substrate, and a region with a large pretilt angle in one substrate is combined with a region with a small pretilt angle in the other substrate, so that the aligning conditions are regulated by the substrate on which the pretilt angle is larger. By utilizing this phenomenon, the alignment of a desired region can be made along a desired direction. In this way, at least two types of aligning conditions are provided for the liquid crystals in one and the same liquid crystal cell, so that the variation in refractive index in the positive viewing angle direction is made smaller, and the viewing angle is widened. In addition, the negative viewing angle characteristics can be improved.

According to the method for producing the LCD of the invention, the aligning conditions can be differentiated for various minute regions of the aligning film by the following various methods.

First, a method for providing the aligning properties to a film which will be an aligning film by light irradiation (hereinafter, referred to as an aligning film material) is described. The principle of the method is described below. When a high energy is applied to the aligning film material by light irradiation, the structure of the polymers from which the aligning film material is made is changed. As a result, for example, a component which causes the pretilt angle to be large is changed, so that the pretilt angle becomes smaller. Alternatively, a chemical reaction occurs, and the pretilt angle becomes larger. A plurality of regions with different pretilt angles are formed in one and the same substrate, and a region with a large pretilt angle in one substrate is combined with a region with a small pretilt angle in the other substrate, so that the aligning conditions are regulated by the substrate on which the pretilt angle is larger. By utilizing this phenomenon, the alignment of a desired region can be made along a desired direction.

The selective light irradiation for various regions of the aligning film material can be performed by inserting a mask (e.g., a patterning substrate) between a light source and the substrate. Alternatively, a resist is applied and then patterned, so that the irradiated region and non-irradiated region by the light can be selectively formed. By irradiating the aligning film material with the light via the mask, prescribed regions of the aligning film material are irradiated with the light. As a result, the resulting aligning film has various aligning conditions for respective regions due to the selective irradiation.

In another embodiment, only desired regions are irradiated with the light by converging the light on the desired regions as spots which are smaller than the regions. In such a case, it is unnecessary to use the light blocking means. The light is converged by a lens, or laser beams can be used. This method can provide various aligning conditions which are different for respective regions having minute areas, as in the above-mentioned method. Laser beams capable of irradiating a large area can be used for irradiation via the mask. This enhances the process performance.

A region which is irradiated or not irradiated may correspond to one picture element, or may correspond to one of the sub-areas obtained by dividing one picture element. Alternatively, a region which is irradiated or not irradiated may be determined by locally changing the intensity of light in one picture element. In this case, as the number of intensity variations of light is increased, a finer image can be obtained. It is sufficient for the incident light to apply a certain energy or higher energies to the aligning film. Accordingly, ultraviolet rays, visible rays, infrared rays, or the like can be used. In addition, it is sufficient for the aligning film material to contain a component which varies depending on the applied energy. Accordingly, instead of the polyimide resin, a resin of polyamide, polystyrene, polyamideimide, epoxyacrylate, polyurethane, or the like can be used.

According to another method of the invention, the film designated to be an aligning film is subjected to a first surface treatment for defining the aligning direction. On the aligning film after the first surface treatment, the above-described operation for determining the pretilt angles is performed as a second surface treatment (the chemical variation of the aligning film surface provided by light irradiation, the roughness of the aligning film surface caused by light irradiation, and the like).

In order to make the aligning film surface rough for controlling the pretilt angles, the following method may be used instead of the light irradiation. That is, prior to the formation of the film designated to be an aligning film, the surface of the underlying transparent conductive film is made rough. Thus, the roughness affects the upper aligning film, so that the aligning film surface is indirectly made rough.

In order to locally change the pattern or the degree of roughness of the transparent conductive film, an insulating film or a resist is provided on part of the transparent conductive film. The surface of the transparent conductive film in such a state is irradiated with light. The irradiated surface of the transparent conductive film is made rough based on the same principle as described above. The part of the surface on which the resist or the insulating film is formed is not irradiated with the light, so that the part has smaller roughness than that of the other part of the surface. Accordingly, the surface conditions are different between the part on which the resist or the insulating film is formed and the other part.

In another method without light irradiation, a transparent conductive film originally having a very rough surface with insulating films is covered with an aligning film. As a result, the surface conditions of the aligning film are different depending on the difference in level caused by the insulating films as well as the surface roughness of the transparent conductive film. According to this method, various aligning conditions with different pretilt angles can be provided for respective minute regions.

As described above, at least two types of aligning conditions are provided for the liquid crystals in one and the same liquid crystal cell, so that the variation in refractive index in the positive viewing angle direction is made smaller, and the viewing angle widened. In addition, the negative viewing angle characteristics can be improved.

This invention can be applied to a scattering mode LCD. The light incident on the LCD in which a plurality of minute discontinuous aligning regions are formed in one and the same liquid crystal cell according to the method of the invention is scattered by the minute regions with different aligning conditions from each other (in the case where no voltage is applied to the liquid crystal cell). When a predetermined voltage is applied between the paired substrates (to the liquid crystal cell), the liquid crystal molecules can be aligned uniformly. As described above, the aligning uniformity is changed based on the voltage applied to the liquid crystal layer, so as to scatter or not to scatter the light. In this way, it is possible to perform the light switching operation.

In the substrate or the LCD of the invention, an aligning film for regulating the alignment of the liquid crystal molecules is formed on part of the transparent electrode, and the other part has no aligning film thereon. Therefore, a minute area in which liquid crystal molecules are in contact with the aligning film is adjacent to another minute area in which liquid crystal molecules are in contact with the transparent electrode. The minute area in which liquid crystal molecules are in contact with the aligning film has different aligning conditions for the liquid crystal from those of the minute area in which liquid crystal molecules are in contact with the transparent electrode. As a result, regions with different pretilt angles are formed on one and the same substrate.

According to the invention, the transparent electrode surface and the aligning film surface may be subjected to different aligning treatments, or only the aligning film surface may be subjected to a rubbing treatment while the transparent electrode surface is not subjected to a rubbing treatment. In both cases, the pretilt angle in a region on the transparent electrode is smaller than that in the region on the aligning film.

When a pair of substrates constituting a liquid crystal cell are combined in such a manner that a region with a larger pretilt angle (a region having an aligning film) in one substrate faces a region with a smaller pretilt angle (a region having no aligning film) in the other substrate, the alignment of liquid crystal molecules is regulated by the substrate with a larger pretilt angle (i.e., the substrate on which the aligning film is formed). By utilizing this phenomenon, a desired aligning direction can be realized in the desired region.

As described above, at least two types of aligning conditions can be provided for the liquid crystal molecules in one and the same liquid crystal cell, so that the resulting LCD can have a plurality of viewing angle conditions. Therefore, the variation in refractive index in the positive viewing angle direction is made smaller. In addition, the reverse phenomenon and the contrast degradation can be suppressed.

The region where an aligning film is formed on the transparent electrode and the region where the aligning film is not formed are formed for alternate picture elements. Alternatively, one picture element may be divided into two or more sub-areas and the regions can be formed for alternate sub-areas. In such a case, as the number of sub-areas obtained by dividing one picture element increases, a finer image can be obtained.

For the aligning film material, conventional organic aligning film materials, such as polyimide, polyamide, polystyrene, polyamideimide, epoxyacrylate, spiranacrylate, polyurethane, and the like can be used.

In the LCD according to the invention, the boundary between regions of the liquid crystal layer with a plurality of different aligning directions is formed continuously over at least two or more picture elements, so that the free energy of the boundary is reduced, and hence one aligning condition is prevented from being absorbed by another aligning condition. The boundary between liquid crystal layer regions with a plurality of different aligning directions in one picture element is parallel to the aligning direction of liquid crystals which are in contact with one substrate, so that the disorder of the alignment of liquid crystals is suppressed. As a result, a disclination line is prevented from occurring.

If the boundary is covered with a light blocking film, the region does not contribute to the display, irrespective of the occurrence of a disclination line.

If the light blocking film is formed of the same material as that for a nonlinear element, it is unnecessary to provide additional steps.

Thus, the invention described herein makes possible the advantages of providing a liquid crystal display apparatus and a method of producing the same, and a substrate, in which the viewing angle characteristics can be effectively improved without causing the production process and the driving method to be complicated. Further the liquid crystal display apparatus has a wide viewing angle with an improved display quality.

These and other advantages of the present invention will become apparent to those skilled in the art upon reading and understanding the following detailed description with reference to the accompanying figures.

BRIEF DESCRIPTION OF THE DRAWINGS

FIG. 30(a) shows a case where the roughness is large. FIG. 30(b) shows a case where the roughness is small.

DESCRIPTION OF THE PREFERRED EMBODIMENTS

Hereinafter, the present invention will be described by way of examples.

Example 1

Figure 1:
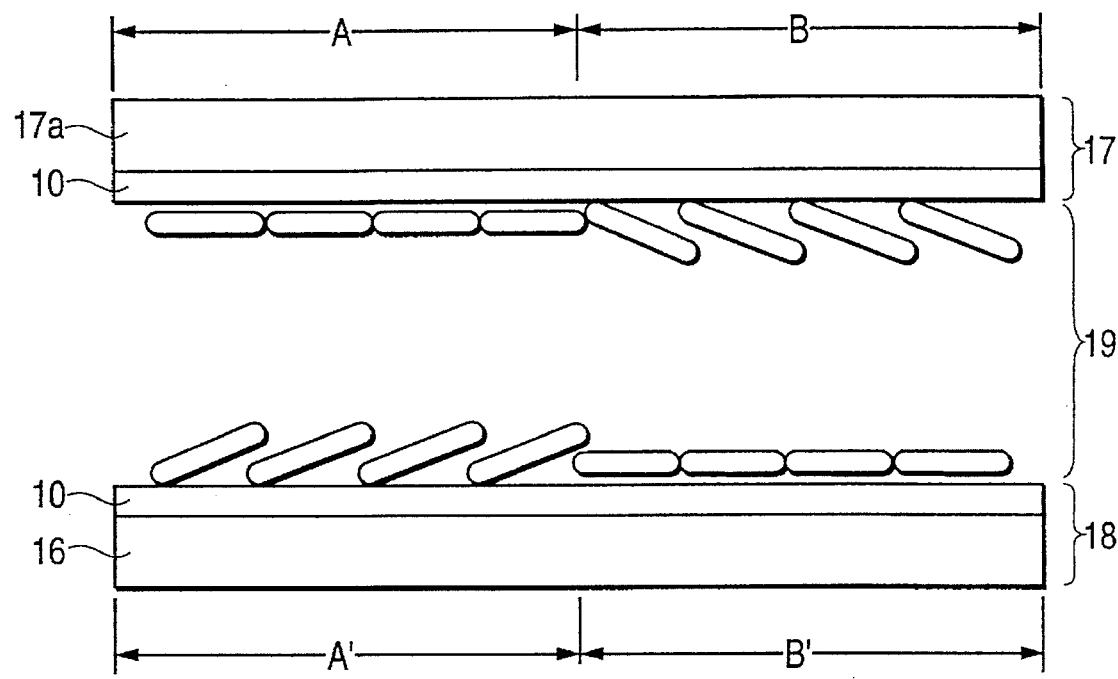
FIG. 1 is a cross-sectional view schematically showing a liquid crystal layer between substrates of which the alignment is controlled according to a method of the invention.

FIG. 1 is a cross-sectional view showing two picture elements in an LCD according to the first example of the invention. The LCD which is an active matrix type includes a liquid crystal layer 19 provided between an active matrix substrate 18 and a counter substrate 17 which are disposed so as to face each other. In the counter substrate 17, a counter electrode (not shown) and an aligning film 10 are formed in this order on the surface of a base substrate 17a which faces the liquid crystal layer 19.

Figure 2:
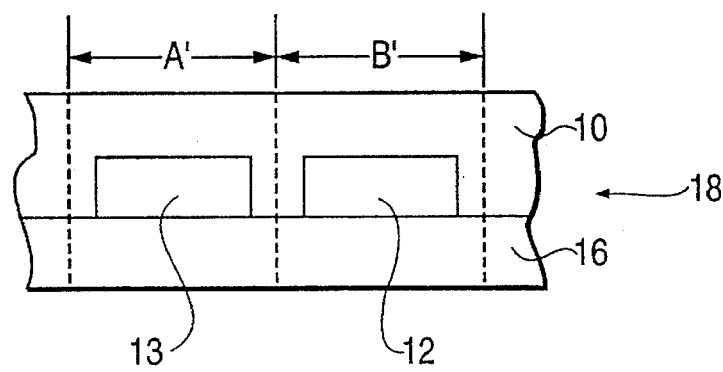
FIG. 2 is a schematic view of a substrate in an LCD according to the first example.

As is shown in FIG. 2, in the active matrix substrate 18, pixel electrodes 12 and 13 are formed in picture element portions A' and B' on an insulating base substrate 16 made of glass or the like. An aligning film 10 is formed on an entire surface of the substrate 16 so as to cover the pixel electrodes 12 and 13.

The LCD with the above construction is produced in the following manner.

First, as shown in FIG. 1, the active matrix substrate 18 and the counter substrate 17 are formed. At this time, the aligning film 10 is formed as an outermost layer for each of the substrates 17 and 18. Either of the substrates 17 or 18 can be produced prior to the other.

Next, the respective aligning films 10 and 10 are subjected to the rubbing treatment, and then the light irradiation step which will be described below is performed.

Next, the substrates 17 and 18 are attached to each other in such a manner that the surfaces of the substrates 17 and 18 on which the aligning films are formed face the inner side. Then, liquid crystals are injected between the substrates 17 and 18, so as to form a liquid crystal layer 19. Thus, the production is completed. It is appreciated that a peripheral circuit such as a drive circuit can be additionally mounted, if necessary.

In the first example, a polyimide (PI) film which is one of the organic polymer films is used for the aligning film 10. A polyimide type polymer includes a polymer main chain, and the main chain direction of the polymer main chain in the surface of the polyimide film is aligned along the rubbing direction by the rubbing treatment which is later performed. Accordingly, it is considered that the liquid crystals which are in contact with the aligning film 10 of polyimide film are aligned in the rubbing direction.

Figure 3:
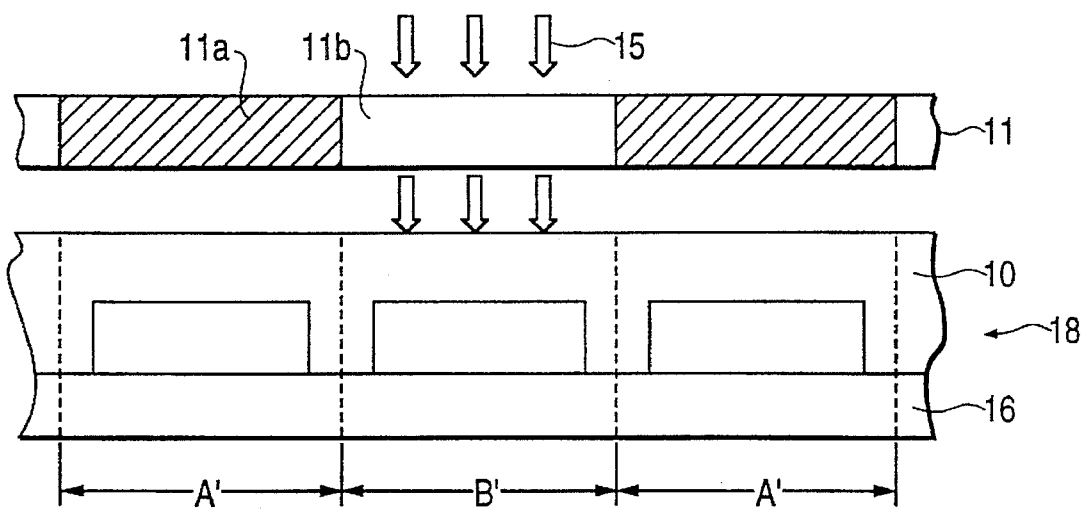
FIG. 3 is a cross-sectional view schematically showing an alignment controlling method according to the invention.

FIG. 3 schematically shows a light irradiation process in the production method of LCD according to the invention. A mask 11 is disposed on the substrate 16 of the active matrix substrate 18, and the aligning film 10 is irradiated with light 15. The hatched portion 11a in FIG. 3 is a light blocking portion which substantially does not transmit the light 15. A non-hatched portion 11b is a light transmitting portion which substantially transmits the light 15. Regions A' and B' of the aligning film 10 are a non-irradiated region and an irradiated region, respectively. The irradiation process of the light 15 can be performed at a certain time after the formation of the aligning film 10. Specifically, the process may be performed after the aligning film 10 is applied, after a first curing is performed, after the aligning film 10 is rubbed, or after the substrate 16 is cleaned after the rubbing. Alternatively, the process can be performed after the counter substrate (not shown) is attached to the substrate 16. In such a case, it is necessary to use light at a wavelength which can pass through the substrate (e.g., glass) since the light is incident via the counter substrate. Before or after the irradiation of the active matrix substrate 18, the light irradiation is performed to the counter substrate 17. At this time, the light irradiation is performed in such a manner that the regions A and B as shown in FIG. 1 correspond to an irradiated region and a non-irradiated region.

Figure 4:
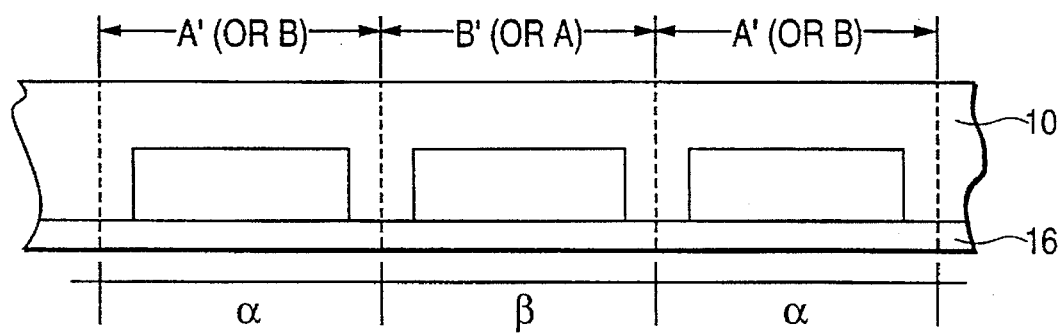
FIG. 4 is a cross-sectional view showing a state where the pretilt angles are varied for respective picture elements by light irradiation shown in FIG. 3.

FIG. 4 shows that the pretilt angle of liquid crystal in the irradiated region is different from the pretilt angle of liquid crystal in the non-irradiated region. In the non-irradiated regions A' and B, the pretilt angle of liquid crystal is α. In the irradiated regions A and B', the pretilt angle of liquid crystal is β.

If a plurality of regions with different pretilt angles are formed in one and the same substrate, and a region with a large pretilt angle is combined with a region with a small pretilt angle between the pair of substrates, the aligning conditions are regulated by the side on which the pretilt angle is larger. By utilizing the phenomenon, the alignment of liquid crystals in a desired region can be made to be aligned along a desired direction. As described above, at least two types of aligning conditions are provided for the liquid crystals in one and the same liquid crystal layer, so that the variation in refractive index in the positive viewing angle direction is made smaller, and the viewing angle is widened. In addition, the negative viewing angle characteristics can be improved.

Based on the following principle, the pretilt angle of the liquid crystal layer 19 which is in contact with the aligning film 10 is changed by the above-described light irradiation.

When the aligning film 10 is irradiated with the light 15, the chemical structure of the aligning film 10 is changed by the energy application. More specifically, when the polyimide aligning film 10 is irradiated with ultraviolet rays (UV rays) 15, $O_3$ (Ozone) is generated. By the action of $O_3$, the alkyl groups of the polyimide are oxidized so as to be carboxyl groups. As a result, the polarity of the surface of the aligning film 10, and hence the pretilt angle of the liquid crystal molecule which is the polarity molecule is changed. This mechanism is an assumption. In another assumption, it is considered that the pretilt angle is changed due to the change of the surface tension of the surface of the aligning film 10 by the light irradiation.

Figure 5:
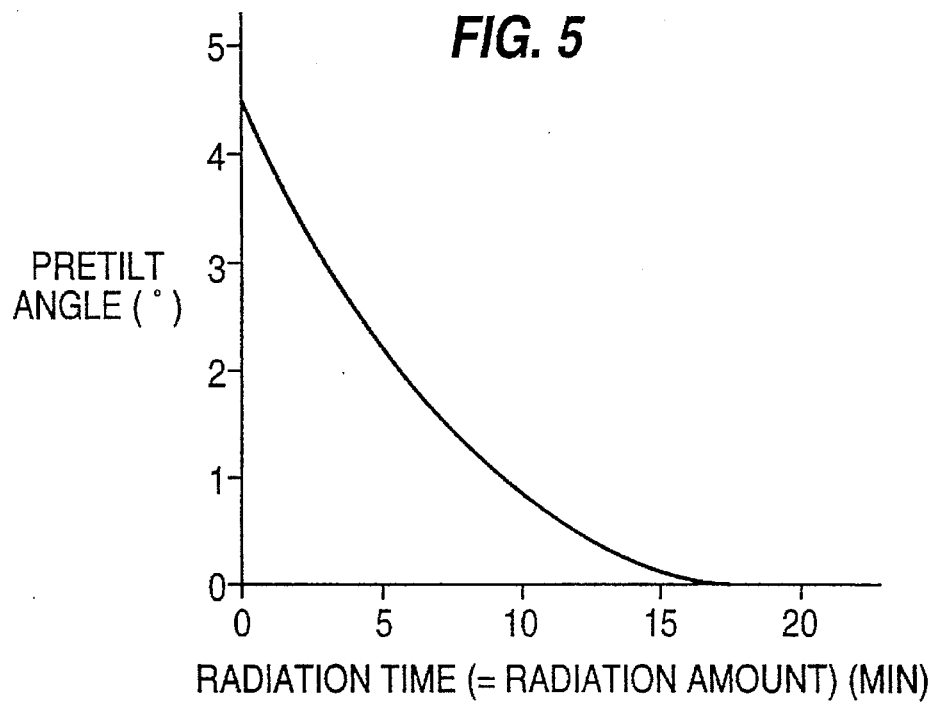
FIG. 5 is a diagram illustrating the light irradiation dependence of the pretilt angle.

The relationship between the light irradiation to the aligning film and the change in the pretilt angle was experimentally confirmed. FIG. 5 is a graph showing the light irradiation dependence of the pretilt angle of the liquid crystal molecule on the aligning film surface. As is seen from the graph, as the time of the light irradiation increases, i.e., as the light irradiation amount is increased, the pretilt angle is made far smaller.

In another mechanism, it was also experimentally confirmed that the degree of roughness of the aligning film surface is changed by applying energy by light irradiation for the aligning film. It was experimentally confirmed that the change in the degree of roughness of the aligning film causes the pretilt angle to be changed, which will be described below.

Figure 6:
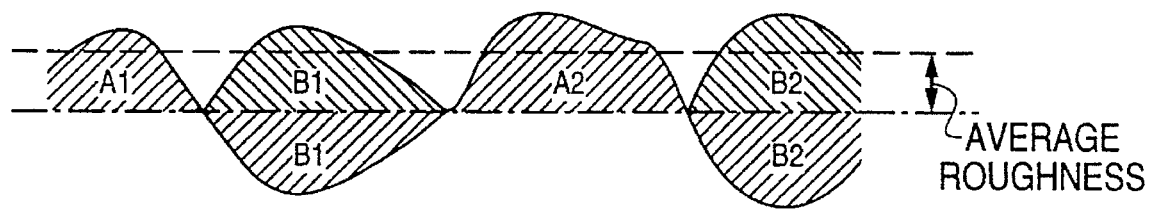
FIG. 6 is a diagram showing the definition of the average roughness.

As one measurement for indicating the roughness degree of the film surface, the average roughness is defined in FIG. 6. The actual surface of the aligning film is indicated by a solid line curve in the figure. The intermediate plane level of the actual surface is indicated by a one-dot chain line. The intermediate plane is defined as being parallel to a plane which satisfies the following expression (1) and in which the square of the difference from the actual surface is minimum;

$$(A1+A2+ \ldots +An)=(B1+B2+ \ldots Bn) \quad (1)$$

where An represents the area of each convex portion of the actual surface (n is a natural number), and Bn represents the area of each concave portion.

Figure 7:
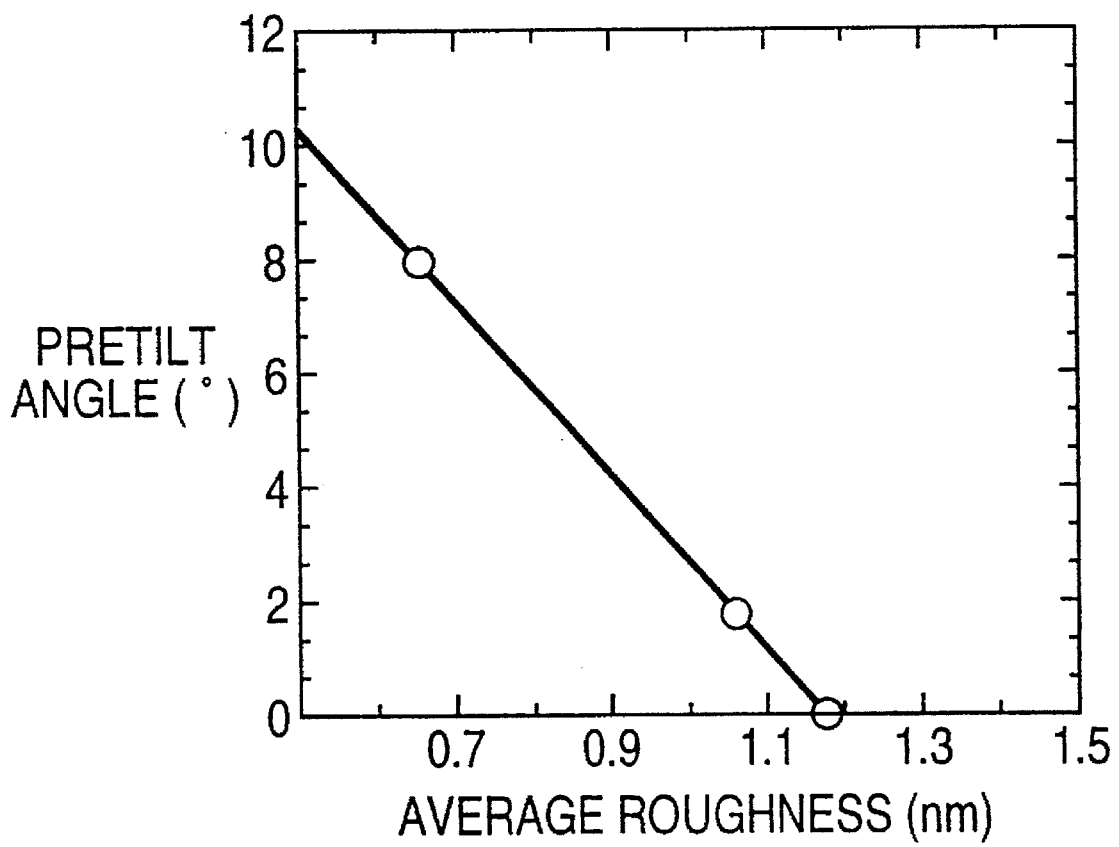
FIG. 7 is a diagram illustrating the average roughness dependence of the pretilt angle.

The average roughness of the film surface is defined as an arithmetic average of the absolute value of the difference between the intermediate plane and the actual plane. In the graph of FIG. 7, the horizontal axis indicates the average roughness, and the vertical axis indicates the pretilt angle. As seen from the graph, the average roughness of the aligning film surface is increased, and the pretilt angle is linearly decreased. By controlling the light irradiation amount, and hence by controlling the roughness of the aligning film surface, the pretilt angle of liquid crystal can be suitably controlled in the range of 0° to about 15°. That is, various LCDs with different pretilt angles can be produced.

In Example 1, the mask 11 is used for the light irradiation process. For the mask 11, for example, a mask which is similar to a photomask usually used in the photolithographic technique can be used. Alternatively, a mask pattern is directly formed on the aligning film 10 by using the photolithographic technique, and then the mask is removed after the light irradiation. However, the case using the patterning of a resist includes a drawback in that the aligning film 10 is largely contaminated.

According to the invention, it is unnecessary to completely block the light 15 by the blocking portion covered with a mask. It is sufficient to make a difference in transmittance between the blocking portion and the non-blocking portion. For example, a material having two or more regions with different transmittances is provided on the substrate 16 as the mask 11. In this way, two or more types of regions with different alignments can be formed in one and the same LCD. In addition, by using the converged light, a predetermined region may be selectively irradiated. The microstructure process using the mask or the converged light can be conducted in the order of about several microns. Therefore, it is possible to form minute areas with different aligning conditions in a desired plane form. For example, in Example 1, each picture element is selectively irradiated with the light using the mask 11. Alternatively, one picture element may be divided into regions which are irradiated and not irradiated with the light 15. In addition to the difference between the irradiated region and the non-irradiated region, the irradiated regions can be differentiated by changing the light intensity. Alternatively, all the regions are irradiated with light, but the light intensities for prescribed regions can be changed (for example, for each picture element). In such a case, as the number of intensity variations is increased, the aligning conditions can be minutely and locally changed.

In the above example, the aligning film 10 of polyimide film is irradiated with the ultraviolet rays. It is appreciated that ultraviolet rays, visible rays, infrared rays, and any combinations thereof can be used for the light 15. Especially when a high energy can be easily used for changing the aligning conditions, it is preferred that the ultraviolet rays with wavelengths of 400 nm or less are used. The light having the wavelength can be surely obtained by using, for example, a high pressure mercury lamp. When the aligning film 10 is irradiated with the ultraviolet rays (UV rays), it is preferred that the irradiation is performed under conditions from 1000 (mJ/cm$^2$) to 10000 (mJ/cm$^2$). As for another light, a laser beam having the same range of wavelengths as those of ultraviolet rays, visible rays or infrared rays can be used. When the laser beams are used, the above effects can be attained in a shorter time period because the energy density is high. Instead of the above light irradiation process, the aligning conditions of the aligning film 10 can be changed locally by another energy beam irradiation. For example, the irradiation of electron beams, ion beams, X-rays or the like can locally change the chemical structure of the aligning film 10.

In this example, the aligning film 10 is formed of a polyimide film. It is appreciated that the aligning film 10 may be formed of other materials. In such a case, the irradiation light is preferred to be appropriately selected based on the kind of material. Alternatively, an inorganic aligning film containing silicon nitride, silicon oxide, magnesium fluoride, a metal or the like as the main component can be used. In such a case, it is necessary to perform the irradiation of light with high energy such as ultraviolet laser beams, electron beams, or the like.

Example 2

Example 2 describes a method by which the surface of the aligning film is made rough by the surface treatment. The substrate structure is the same as that in Example 1.

In Example 2, the method is performed as follows. First, polyimide as the aligning film material is applied by spin-coating, printing, or the like, so as to form the aligning film. The aligning film materials may include organic films of polyimide, polyamide, polystyrene, polyamideimide, epoxyacrylate, spiranacrylate, polyurethane, and the like.

Next, after the aligning film is cured, the aligning film is rubbed with a burnishing cloth. That is, a first surface treatment is performed.

Thereafter, the aligning film surface is in contact with an alkaline solution, which is a second surface treatment. By utilizing the non-uniform solubility of the solution to the aligning film, a desired degree of roughness is formed on the aligning film surface. As the alkaline solution, for example, 0.5% NaOH aqueous solution, 2.38% TMAH aqueous solution, or the like can be used. Instead of the alkaline solution, it is possible to use an acidic solution containing a hydrofluoric acid, a nitric acid or both of them as the main component. Alternatively, ozone or ammonia gas which is a reaction gas can be used. Alternatively, a plasma in a gas containing argon or krypton as the main Component can be used.

Example 3

Example 3 describes the case where the surface of an underlying film under the aligning film is made rough, the roughness of the underlying film affects the aligning film, so as to make the aligning film surface rough. The roughness at the surface of the underlying film can be made by any one of the methods for making the aligning film surface rough described in Examples 1 and 2. Alternatively, a method for adjusting the depositing conditions for the underlying film (hereinafter, referred to as a deposit condition adjusting method) can be used. According to this method, for example in the case where a transparent conductive film is deposited by sputtering, as the density of sputter target is increased, or as the depositing rate is decreased, the surface of the deposited transparent conductive film becomes flat with small roughness. Under the reversed conditions, the surface of the deposited transparent conductive film becomes rough.

The above-described methods can be used solely, or in combination with each other. When the surface is made rough by using light of short wavelength with high energy or an optical energy by a laser or the like, the roughness can selectively be formed by converging the light with a light converging device in addition to a mask.

Figure 8:
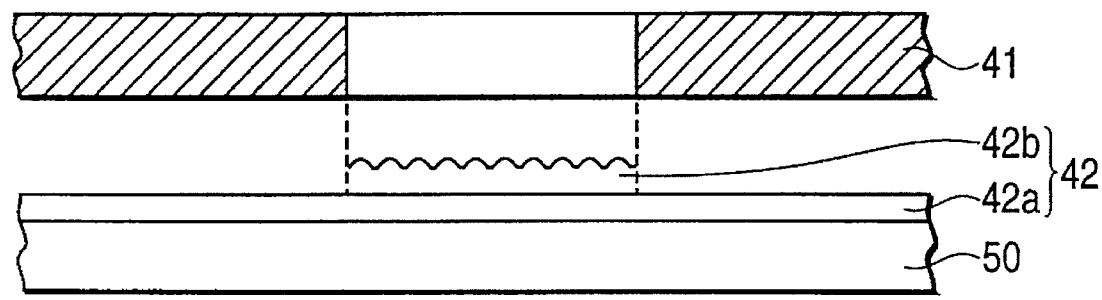
FIG. 8 is a cross-sectional view schematically showing another alignment controlling method according to the invention.

Next, a specific method for making the aligning film surface rough according to this example will be described with reference to FIG. 8.

First, a first transparent conductive film 42a having a flat surface with small roughness is formed on a substrate 50 (a glass substrate) by sputtering, vapor deposition, or the like. Thereafter, a second transparent conductive film 42b having a surface with large roughness is formed on a prescribed region of the first transparent conductive film 42a. The second transparent conductive film 42b is formed in the following manner. For example, in a sputtering apparatus (or in a deposition apparatus), a film to be the second transparent conductive film 42b is deposited on the first transparent conductive film 42a with a metal mask 41 interposed between the target (deposition source) and the substrate 50, so as to grow the second transparent conductive film 42b on the prescribed region of the first transparent conductive film 42a. At this time, by the above-described deposit condition adjusting method, the deposition rate of the second transparent conductive film 42b is made higher than that of the first transparent conductive film 42a. As a result, the roughness degree of the surface of the second transparent conductive film 42b is higher than that of the surface of the first transparent conductive film 42a. For the first and second transparent conductive films 42a and 42b, ITO films are used. Instead of the ITO films, it is appreciated that other materials can also be used.

Next, an aligning film (not shown) is formed so as to cover the underlying films such as the transparent conductive films 42a and 42b, and the aligning film is subjected to a rubbing treatment. After the formation of the aligning film, the same process steps as those in the prior art are adopted.

Figure 9:
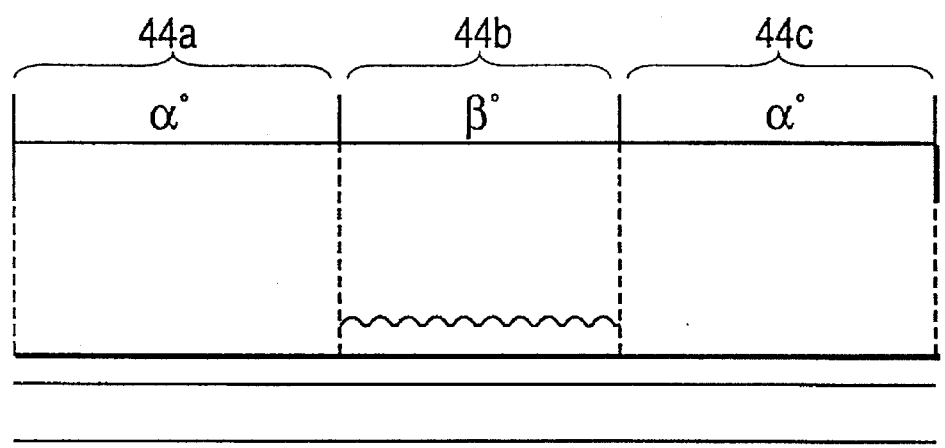
FIG. 9 is a cross-sectional view showing a state where the pretilt angles are varied for respective picture elements according to the method shown in FIG. 7.

According to Example 3, as is schematically shown in FIG. 9, the aligning conditions of the liquid crystals can be changed for each of picture element portions 44a, 44b, and 44c. This is because the aligning conditions of a portion of the aligning film in which the surface of the underlying film (the transparent conductive film) is flat (a portion where the first transparent conductive film 42a is exposed) are different from those of the other portion of the aligning film in which the surface of the underlying film is rough (a portion where the second transparent conductive film 42b is formed). Example 3 utilizes a fact that the pretilt angles of liquid crystals can be changed by the difference in the surface conditions of the underlying films (the transparent conductive films 42a and 42b). In the picture element portions 44a and 44c in which the surface of the underlying film is flat, the pretilt angle remains to be $\alpha$. In the picture element portion 44b in which the surface of the underlying film is rough, the pretilt angle changes to be $\beta$. In the method for controlling the aligning conditions of the aligning film by using underlying films as in Example 3, any film can be used for the underlying film, as far as the degree of roughness of the underlying film surface can be locally changed.

In Example 3, the methods for making the aligning film surface rough described in Examples 1 and 2 can be used for the method for making the underlying film surface rough. Alternatively, it is possible to use a lift-off method which will be described with reference to FIG. 8. In the lift-off method, a resist pattern film (not shown) having an opening for exposing a prescribed region of the first transparent conductive film 42a is first formed on the first transparent conductive film 42a. Such a resist pattern film is formed with a photomask having a pattern corresponding to that of a mask 41 by using a known photolithographic technique.

Next, a film to be the second transparent conductive film 42b is deposited on the entire surface of the resist pattern film and the first transparent conductive film 42a. Thereafter, the resist pattern film is removed, so that the portion on the resist pattern film is also removed. As a result, the second transparent conductive film 42b is formed on the prescribed region of the first transparent conductive film 42a.

As described above, according to the alignment controlling method of Example 3, the pretilt angles of liquid crystals in one of the same LCD can locally and easily be changed. By using this method, the viewing angle characteristics in TN mode or STN (super twisted nematic) mode can be improved.

According to the method used in Example 3, the resist pattern film may be formed on the transparent conductive film 42a, but may not be formed on the aligning film. Accordingly, there is no possibility that the aligning film is contaminated by the photolithographic process for forming the resist pattern film.

Example 4

In Example 4, the surface of the transparent conductive film as the underlying film is made rough, and the roughness affects the aligning film disposed above, so as to make the surface of the aligning film rough. As a method for selectively making the surface of the transparent conductive film rough, a method for patterning a resist using conventional photolithography on part of the transparent conductive film, and then for locally making the surface rough by light irradiation is adopted.

The method for making the aligning film surface rough according to Example 4 will be described below.

Figure 10A:
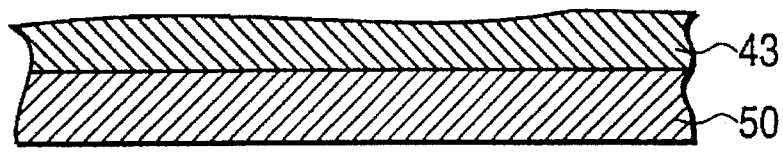
FIGS. 10(a) to 10(e) are cross-sectional views showing an exemplary production process of an LCD in the fourth example according to the invention.
Figure 10B:
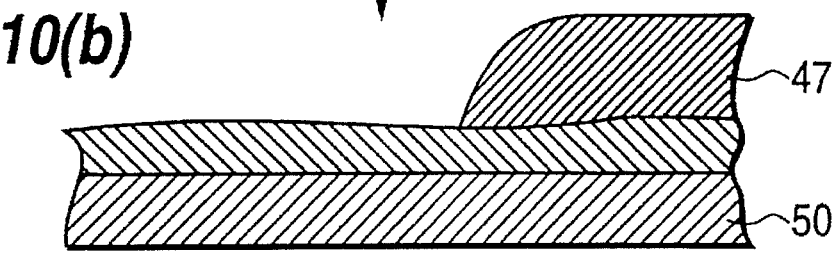
Figure 10C:
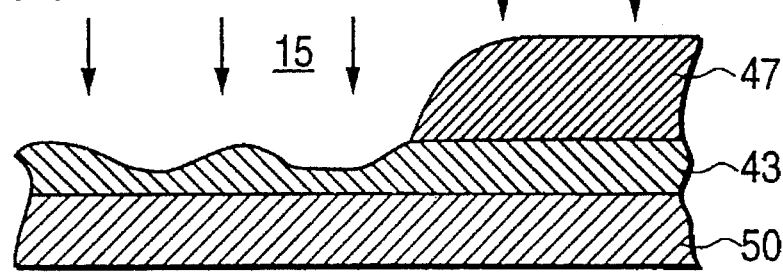
Figure 10D:
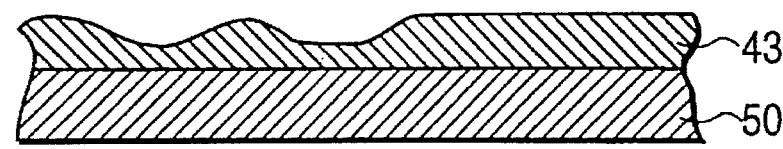

First, referring to FIG. 10(a), a transparent conductive film 43 is formed on a substrate 50. Next, as is shown in FIG. 10(b), a resist 47 is formed on a portion of the transparent conductive film 43. In this state, as is shown in FIG. 10(c), the substrate 50 is perpendicularly irradiated with light 15 from the side on which the transparent film 43 is formed. The portion of the transparent conductive film 43 which is covered with the resist 47 is not irradiated with the light, so that the surface condition of the portion is not changed from that at the formation of the transparent conductive film 43, as is shown in FIG. 10(d). On the contrary, the chemical structure of the surface of the portion irradiated with the light is changed, so as to make the surface rough.

After the light irradiation, the resist 47 is removed as is shown in FIG. 10(d).

Figure 10E:
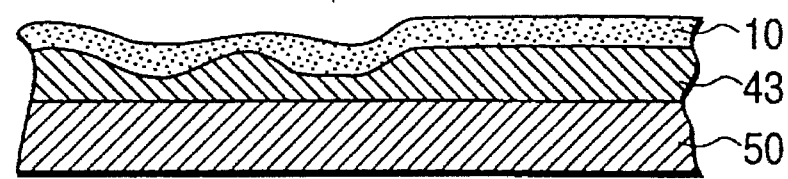

Finally, as is shown in FIG. 10(e), on the surface of the substrate 50 on which the resist 47 has been removed, an aligning film 10 is formed so as to cover the transparent conductive film 43. The difference between the surface conditions of the irradiated and non-irradiated portions of the transparent conductive film 43 affects the surface conditions of the aligning film 10 formed thereon, so that the aligning film 10 includes a rough portion and a flat portion at the surface thereof.

Figure 11A:
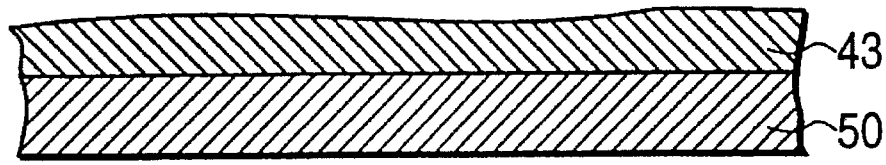
FIGS. 11(a) to 11(d) are cross-sectional views showing an exemplary production process of an LCD in the fifth example according to the invention.
Figure 11B:
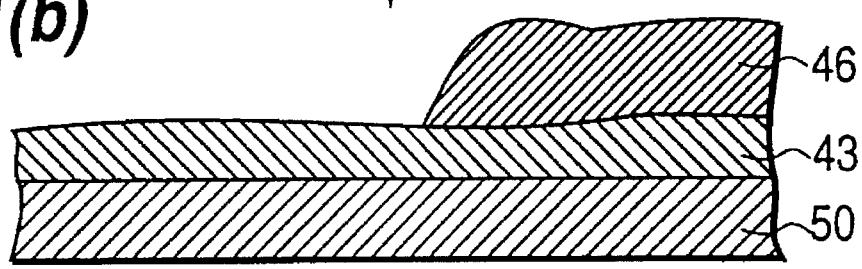
Figure 11C:
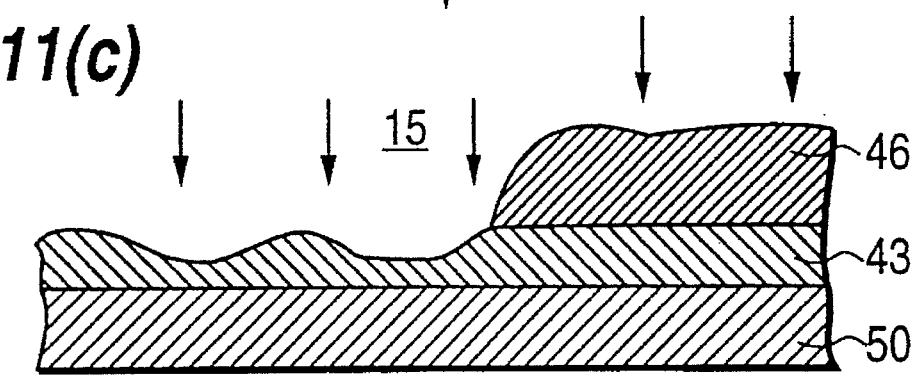
Figure 11D:
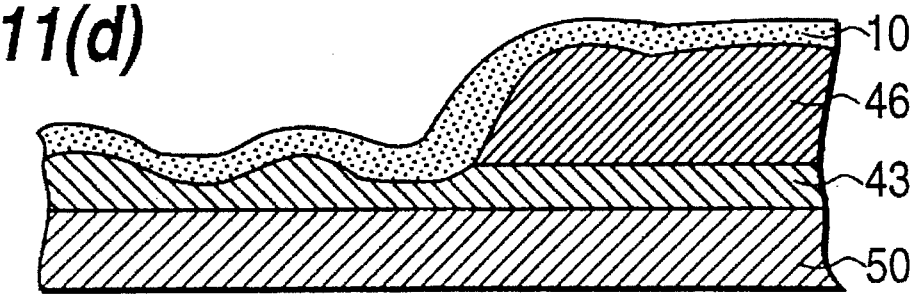

In Example 4, instead of the resist, an insulating film can be used. The process steps in the case of the insulating film are schematically shown in FIG. 11. First, as is shown in FIG. 11(a), a transparent conductive film 43 is formed on a substrate 50. Next, as is shown in FIG. 11(b), an insulating film 46 is formed on a portion of the transparent conductive film 43. In this state, as is shown in FIG. 11(c), the substrate 50 is perpendicularly irradiated with light 15 from the side on which the transparent conductive film 43 is formed. Next, an aligning film 10 is formed on the substrate 50, as is shown in FIG. 11(d). That is, except for the step of removing the resist, the process steps are the same as in the case of the resist. The degree of roughness of the surface of the insulating film 46 is different from that of the surface of the portion of the transparent conductive film 43 which is not covered with the insulating film 46, because of the difference in material therebetween. Therefore, the degree of roughness of the surface of the aligning film 10 is locally varied. Moreover, the aligning film is formed while the insulating film remains on the transparent conductive film, so as to cover them. Accordingly, in the region where the insulating film is formed, in addition to the difference in the surface conditions between the insulating film and the transparent conductive film, the difference in the level between the insulating film surface and the transparent conductive film surface is added to the factor of the roughness which affects the aligning film surface.

In the case of using the insulating film, the process is simplified because the step of removing the resist is eliminated. In addition, in terms that the insulating treatment and the aligning control are commonly performed, the production process is simplified, so that an LCD with viewing angle characteristics of high reliability can be provided at a low cost.

In Example 4, in order to form the roughness, a method in which the aligning film is in contact with an acidic or alkaline solution or in contact with a reaction gas or a plasma in a gas may be used.

Example 5

In Example 5, the same as in Examples 3 and 4, the surface of the underlying film of the aligning film is made rough, and the roughness is transferred to the aligning film, so as to make the aligning film surface rough. By forming an insulating film on the rough surface of the transparent conductive film, the degree of roughness of the insulating film is made smaller, so that the various rough conditions are transferred to the aligning film.

The process steps in Example 5 are schematically shown in FIG. 12.

Figure 12A:
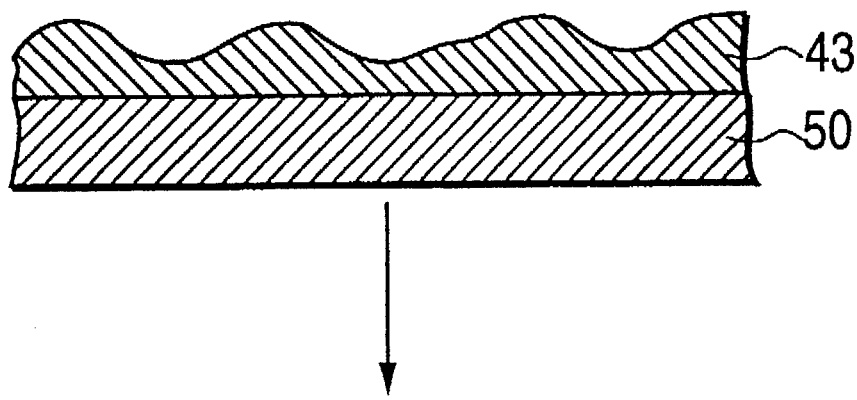
FIGS. 12(a) to 12(c) are cross-sectional views showing an exemplray production process of an LCD in the fifth example according to the invention.
Figure 12B:
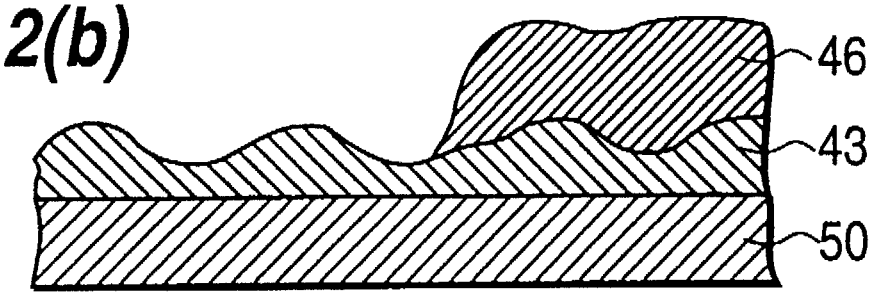

First, as is shown in FIG. 12(a), a transparent conductive film 43 is formed on a substrate 50, and the surface thereof is made rough by light irradiation or another operation. Next, as is shown in FIG. 12(b), an insulating film 46 is formed on a portion of the transparent conductive film 43. Accordingly, a reduced degree of roughness is formed at the surface of the insulating film 46. For the insulating film 46, silicon nitride, silicon oxide, or the like can be used.

Figure 12C:
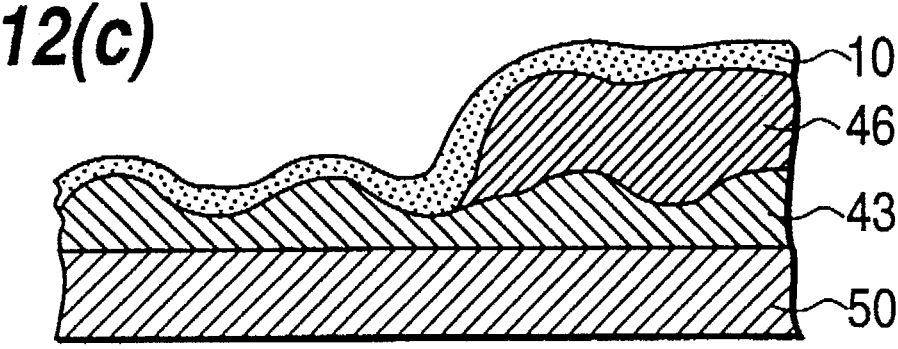

Finally, as is shown in FIG. 12(c), an aligning film 10 is formed on the surface of the substrate 50 so as to cover the transparent conductive film 43 and the insulating film 46.

In the portion in which the insulating film is formed, in addition to the difference in the surface conditions between the insulating film and the transparent conductive film, the difference in level between the insulating film surface and the transparent conductive film surface is also the factor of the roughness which affects the aligning film surface.

In Example 5, it is possible to perform light irradiation or another operation for forming the roughness before the formation of the insulating film. In addition, the insulating treatment and the aligning control are commonly performed, so that the production process is simplified, so that an LCD with viewing angle characteristics of high reliability can be provided at a low cost.

Instead of the aforesaid examples in which the degree of roughness is regulated for each region, this example can be implemented in such a manner that the degree of roughness is set substantially uniformly in each region, but the surface of the aligning film is made rough depending on the thickness of the aligning film. In other words, in a region where the aligning film is thin, the roughness of the underlying film surface is largely transferred, so that the roughness of the aligning film surface in this region is larger than in another region where the aligning film is thick.

In Example 5, in order to form the roughness, the light irradiation, a method in which the aligning film is in contact with an acidic or alkaline solution or in contact with a reaction gas or a plasma in a gas, may be used.

Example 6

In Example 6, the underlying film is formed of different materials for prescribed regions. Thus, the nonuniformity in the surface treatment due to the different materials of the underlying film is utilized so as to make the underlying film surface rough. Thereafter, an aligning film is formed on the underlying film having the rough surface, so that the aligning film can have a plurality of regions with different levels.

By the above-described Examples 1 to 6, regions with different aligning conditions, i.e., different viewing angle characteristics can easily be formed in one and the same LCD in a desired pattern. Therefore, in each of Examples 1 to 6, aligning conditions of liquid crystals can be different for various minute areas. Accordingly, it is possible to improve the viewing angle characteristics which cause a problem when an aligning film is used for aligning the liquid crystals in a certain direction. Moreover, it is possible to improve the reverse phenomenon in the positive viewing angle direction which is conventionally considered as a serious problem. In addition, it is unnecessary to divide each pixel electrode, so that the production process and driving method is simplified.

In each of Examples 1 to 6, different viewing angle characteristics are formed, so that the viewing angles in the TN mode and the STN mode can be improved. For example, in the case where an LCD of TN mode type is disposed between a pair of polarizing plates, in order to improve the viewing angle characteristics such as the reverse phenomenon of liquid crystal display, it is considered that the refractive indices of the liquid crystal molecules in the vertical direction (in the perpendicular direction with respect to the viewer) are preferably set equal to each other regardless of the viewing angle. That is, in the positive viewing angle direction, it is sufficient to suppress the change of anisotropy ($\Delta$ n) of the refractive index in the vertical direction from large to O and then to large (in the reverse direction), as the viewing angle is made deeper from the position directly above the LCD (in the direction perpendicular to the substrate face).

The LCD in each of Examples 1 to 6 can be applied to a scattering mode LCD. In the LCD, a plurality of different aligning conditions are formed for respective minute areas, so that the light incident on the liquid crystal layer is scattered when no voltage is applied to the liquid crystal layer because the aligning angles of liquid crystal molecules are different from each other for respective minute areas. When a voltage is gradually applied to the liquid crystal layer, the liquid crystal molecules gradually stand, so the liquid crystal layer transmits the incident light. As described above, based on the voltage applied to the liquid crystal layer, it is possible to perform the light switching operation.

A specific substrate structure applied to each of Examples 1 to 6 can be a segment structure, a dot matrix structure, or the like. Alternatively, the present invention can be applied to any substrate structure which is conventionally used in the LCD.

The degree of roughness in each of Examples 1 to 6 may be changed for each picture element, for each one of plural sub-areas obtained by dividing one picture element, or for a predetermined or uncertain number of picture elements. In the case where the degree of roughness is changed for each picture element, a finer image can be obtained.

Example 7

Figure 13A:
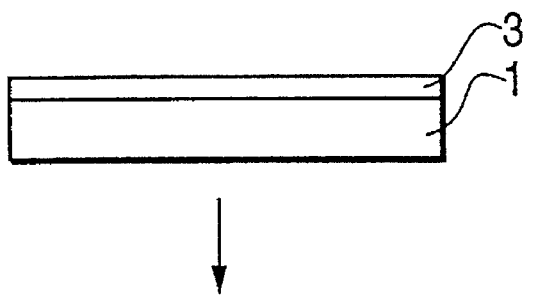
FIGS. 13(a) to 13(f) are cross-sectional views showing an exemplary production process of a substrate in the seventh example according to the invention.
Figure 13B:
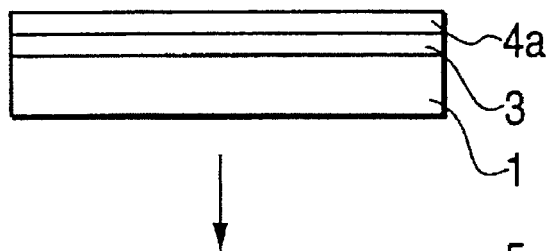
Figure 13C:
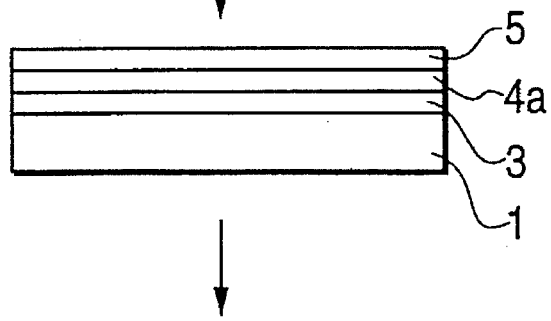
Figure 13D:
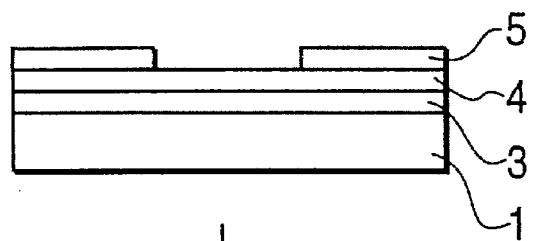
Figure 13E:
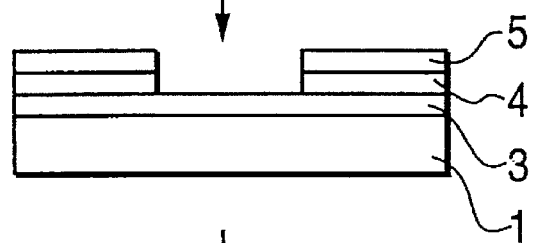
Figure 13F:
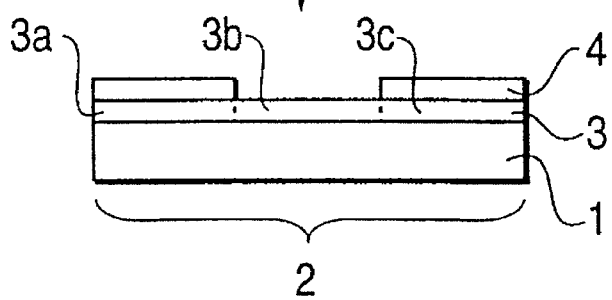

FIG. 13(f) is a cross-sectional view showing the substrate of this example. The substrate is used in an LCD. In the substrate, a transparent electrode 3 is formed in a portion corresponding to the picture element portion 2 on the transparent substrate 1 made of a glass plate or the like. An aligning film 4 is formed on portions 3a and 3c of the transparent electrode 3. The aligning film 4 is not formed on the remaining portion 3b.

The actual structure of the transparent substrate 1 on which the picture element portion 2 is formed can be suitably selected, and any substrate structure which is conventionally used in the LCD can be applied. In the transparent electrode 3, the positions of the portions 3a and 3c on which the aligning film 4 is formed and the portion 3b with no aligning film 4 can be appropriately set.

The above-described substrate can be produced, for example, in the following manner.

First, by a known manner, as is shown in FIG. 13(a), a transparent electrode 3 is formed on a portion corresponding to the picture element portion 2 on the transparent substrate 1. Next, the surface of the transparent electrode 3 is subjected to an aligning treatment. As the aligning treatment, for example, a rubbing treatment can be used. A rubbing treatment for a film made of inorganic material such as a transparent electrode requires stronger conditions (including the kind of rubbing cloth, the strength of rubbing, and the like) than the rubbing treatment for a film made of organic materials. In this example, the rubbing conditions are set such that a cloth made of rayon is used and the strength is set to be three times as large as the rubbing for an organic film.

Thereafter, as is shown in FIG. 13(b), a film 4a to be an aligning film is formed on the substrate of the above-mentioned state. In this example, the film 4a is a polyimide film.

Next, as is shown in FIG. 13(c), a resist 5 is applied onto the film 4a. In this example, a negative type resist is used. By using the resist 5 as a mask, the film 4a is exposed to light and the resultant film 4a is developed. As a result, part of the film 4a is removed, as is shown in FIG. 13(d).

Next, as is shown in FIG. 13(e), the film 4a is patterned, so as to form an aligning film 4.

Thereafter, as is shown in FIG. 13(f), the resist 5 is removed, and the surface of the remaining aligning film 4 is subjected to the usual rubbing treatment. The polyimide type polymer includes a polymer main chain, and the longer chain direction of the polymer main chain in the polyimide film surface is aligned in the rubbing direction as the result of the rubbing treatment. Accordingly, it is considered that the liquid crystal molecules which are in contact with the polyimide film are aligned in the rubbing direction. As described above, the substrate for the LCD can be obtained.

The above production process can be performed without the rubbing treatment for the transparent electrode 3. In both the cases, the pretilt angle on the transparent electrode 3 is usually smaller than the pretilt angle on the aligning film 4, so that different aligning conditions can be formed on one and the same substrate.

Figure 14A:
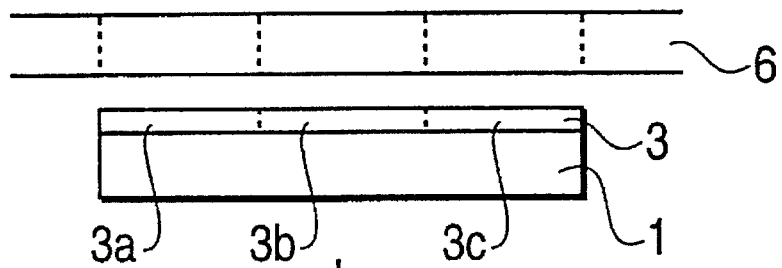
FIGS. 14(a) and 14(b) are cross-sectional views showing another exemplary production process of a substrate in the seventh example according to the invention.
Figure 14B:
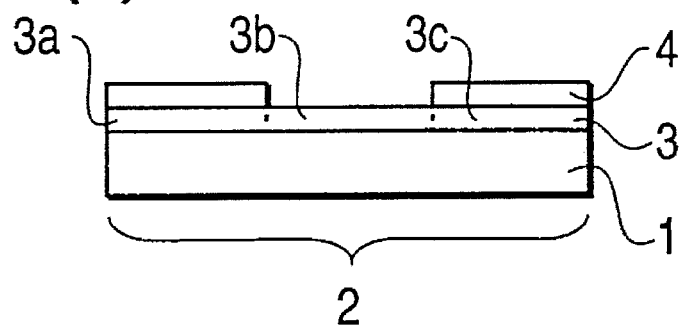

The aligning film 4 can be formed by printing using a pattern 6 on which a desired pattern is formed, as is shown in FIG. 14(a). According to this method, depending on the pattern formed on the pattern 6, portions 3a and 3c on which the aligning film 4 is printed, and a non-printed portion 3b are formed on the transparent electrode 3. Accordingly, only by printing the aligning film, an aligning film 4 which is patterned can be obtained, as is shown in FIG. 14(b). Also, in this case, it is possible to perform or not to perform the rubbing treatment for the transparent electrode 3.

In this way, two substrates each having different aligning conditions are produced, and they are attached to each other so as to form an LCD in such a manner that a portion in which the aligning film is formed on one substrate opposes a portion in which the aligning film is not formed on the other substrate. As a result, the viewing angle for the LCD can be improved.

Example 8

Figure 15:
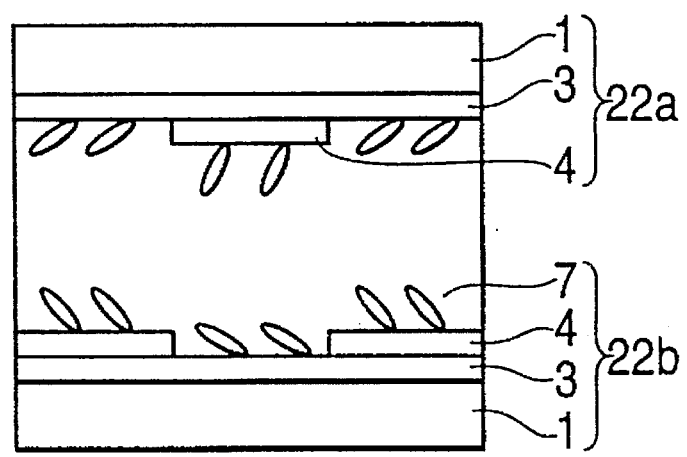
FIG. 15 is a schematic cross-sectional view showing an LCD in the eighth example according to the invention.

FIG. 15 shows a schematic cross-sectional view of a liquid crystal cell portion in an LCD of Example 8. The liquid crystal cell includes substrates 22a and 22b with different aligning conditions. The substrates are disposed opposite to each other in such a manner that a portion of the substrate 22a on which an aligning film is formed faces a portion of the substrate 22b on which an aligning film is not formed.

The substrates 22a and 22b can be produced by the method described in Example 7. In the case where the transparent electrode is not subjected to the rubbing treatment, it is possible to control the aligning conditions by using a treatment agent. The treatment agent is used in order to enhance the printing ability of the aligning film, and is applied onto the transparent electrode. In the case where the TN type LCD is produced, the application amount of the chiral agent is adjusted so as to obtain the continuous twist of 90° within the predetermined liquid crystal cell thickness.

In both cases, the pretilt angle on the transparent electrode 3 is usually smaller than the pretilt angle on the aligning film 4. Therefore, the aligning conditions of the liquid crystal molecules 7 are regulated by the substrate on which the aligning film 4 is formed, so that the aligning directions are differently directed as is shown in FIG. 15. Therefore, it is possible to form regions with different aligning conditions in a selected pattern in one and the same liquid crystal cell, so that two or more different viewing angle directions can be commonly provided in one and the same liquid crystal cell.

As described above, a plurality of different viewing angle directions are commonly provided, so that the viewing angle characteristics can be improved and the viewing angle can be widened. In the TN type or the STN type LCD, the reverse phenomenon and the contrast degradation can be eliminated.

The portions where the aligning film is formed and is not formed on the transparent electrode can be formed alternately for respective picture elements, and alternatively can be formed by dividing one picture element into two or more sub-areas. When one picture element is divided and the portions are formed, a finer image can be obtained.

Example 9

Figure 16:
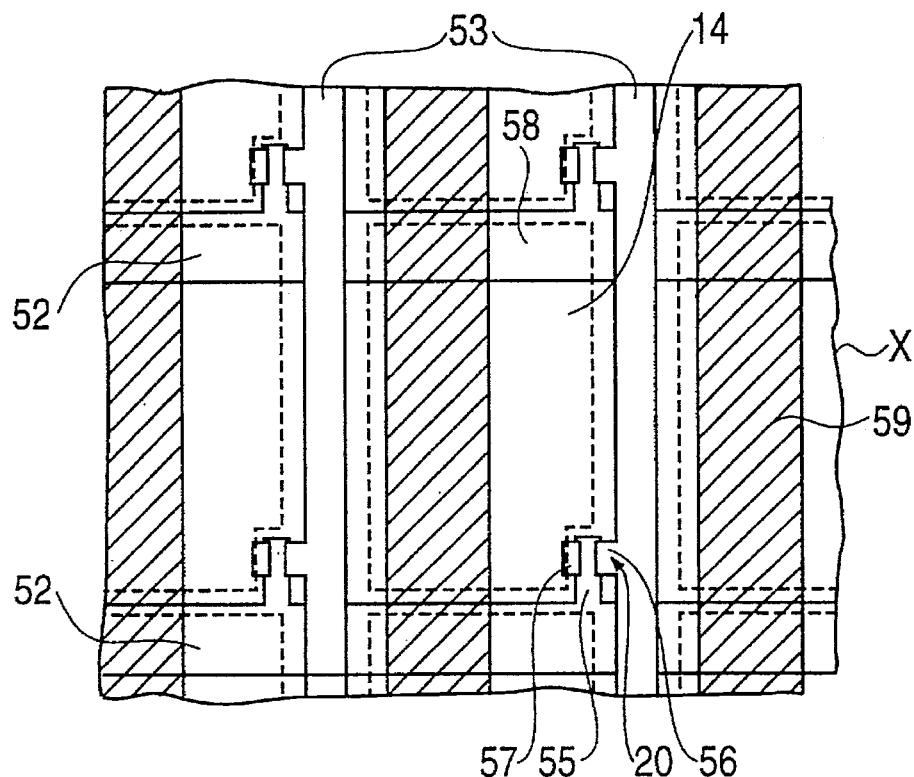
FIG. 16 is a plan view showing an LCD in the ninth example according to the invention.
Figure 17:
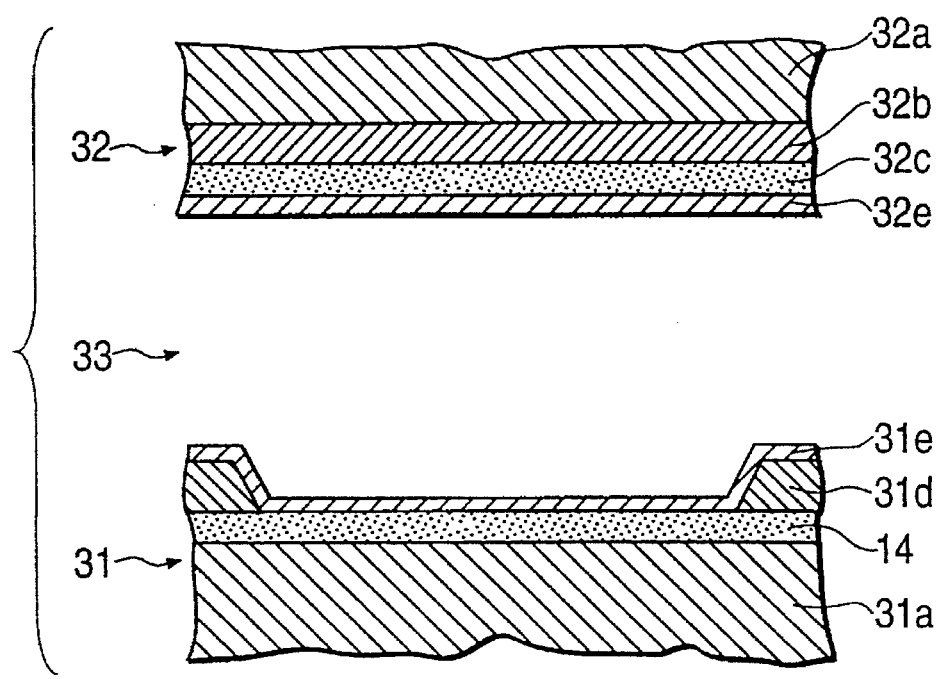
FIG. 17 is a cross-sectional view showing the LCD shown in FIG. 16.

FIG. 16 is a plan view showing one example in which the present invention is applied to the TN mode active matrix type LCD. FIG. 17 is a cross-sectional view thereof. In the LCD, as is shown in FIG. 17, an active matrix substrate 31 is disposed so as to oppose a counter substrate 32, and a liquid crystal layer 33 is sealed therebetween. In the active matrix substrate 31, a plurality of scanning lines 52 and a plurality of signal lines 53 are formed so as to cross each other on an insulating substrate 31a made of glass. In each of the areas defined by the scanning lines 52 and the signal lines 53, a pixel electrode 14 is disposed. In the vicinity of each of the crossings of the scanning lines 52 and the signal lines 53, a thin film transistor 20 (hereinafter referred to as a TFT) as a nonlinear element having a switching function is formed. The TFT 20 is electrically connected to one of the scanning lines 52, one of the signal lines 53, and the corresponding pixel electrode 14. The TFT 20 is formed on a gate electrode 55 which is branched from the scanning line 52 on one side of the pixel electrode 14. The gate electrode 55 opposes a source electrode 56 which is branched from the signal line 53 toward the pixel electrode 14, and also opposes a drain electrode 57 which is branched from the pixel electrode 14 toward the source electrode 56. As the TFT 20, an amorphous silicon TFT is employed in this example. The TFT 20 can be formed on the scanning line 52.

On the pixel electrode 14, there is superposed a scanning line 52 which is adjacent to the scanning line 52 including the TFT 20 connected to the pixel electrode 14. The superposed portion constitutes an additional capacitance 58. In an alternative case, an additional capacitance line (not shown) is formed separately from the scanning line 52. In such a case, the additional capacitance 58 can be formed on the additional capacitance line.

Above these electrode lines, that is, above the scanning lines 52 and the signal lines 53, and above the TFTs 20, an insulating protective film 31d is formed in order to prevent short-circuits between the counter substrate 32 and these electrode lines and the TFTs and between the TFTs and the electrode lines. The insulating protective film 31d can be formed so as to have openings corresponding to respective pixel electrodes 14.

In the counter substrate 32 which faces the active matrix substrate 31 having the above-described structure, a color filter 32b, a counter electrode 32c, and an aligning film 32e are formed on the insulating substrate 32a in this order.

When the following process steps are performed for the LCD of this example having the above construction, an LCD which can actually be driven to display can be produced. Specifically, the LCD which can actually be driven to display is produced by a step for forming aligning films 31e and 32e on the active matrix substrate 31 and the counter substrate 32, respectively, a step for performing a rubbing treatment for the aligning film 31e, a step for attaching the active matrix substrate 31 to the counter substrate 32, a step for providing a liquid crystal layer 33 by injecting liquid crystals between the substrates 31 and 32, additional steps, and then a step for mounting peripheral circuits such as a drive circuit.

In the production process, some process steps for providing a plurality of liquid crystal aligning directions in one picture element are performed. In this example, an aligning treatment is performed for the aligning film 31e of the active matrix substrate 31, so as to form a liquid crystal layer region 59 in which aligning directions are different over two or more picture elements while two aligning directions exist in one picture element. In other words, the aligning direction of the liquid crystal layer region 59 is reversed from the aligning direction of the other regions. Such aligning conditions can be realized by performing the aligning treatment in a state where a protective film is formed on one of two liquid crystal layer regions with different aligning directions, by removing the protective film, by performing another aligning treatment in a state where another protective film is formed on the other liquid crystal layer region, and then by removing the protective film. In an alternative case, a region of the surface of the pixel electrode 14 is chemically changed by using liquid such as an acidic or alkaline solution, so as to make the surface rough. Thus, the aligning directions are controlled by utilizing the difference in tilt angles or tilt directions between the rough region and the flat region. As a method for making the surface rough, the surface may be chemically changed by plasma, or electromagnetic waves including light, or the surface may be physically changed by solid, gas, plasma, or electromagnetic waves including light.

In the case where the insulating film is formed above and the electrode lines and the TFTs, in order to prevent short-circuits between the substrates and between the electrode lines, the insulating film surface is treated so as to chemically change the surface condition by using liquid such as an acidic or alkaline solution, gas, plasma, or electromagnetic waves including light, or the like, or so as to physically change the surface condition by using solid, gas, plasma, electromagnetic waves including light, or the like. As a result, the aligning directions can be controlled by controlling the tilt angles or the tilt directions.

Accordingly, in this example, a liquid crystal layer region in which aligning directions are different over two or more picture elements while two aligning directions exist in one picture element is formed. Accordingly, a boundary X of liquid crystal regions with different aligning directions is positioned over two or more picture elements. As a result, the free energy included in the boundary is reduced, so that the possibility that one aligning condition is absorbed by the other aligning condition can be avoided. In this way, the anisotropy of refractive indices of liquid crystal molecules is not lost, and it is possible to ensure the optical rotatory power of light. As a result, the viewing angle dependence can be eliminated.

In the above-described example, the aligning treatment is performed for the aligning film 31e of the active matrix substrate 31. Alternatively, the aligning treatment may be performed only for the aligning film 32e of the counter substrate 32, or for both the aligning films 31e and 32e of the substrates 31 and 32. In such cases, it is possible to eliminate the viewing angle dependence.

Figure 18:
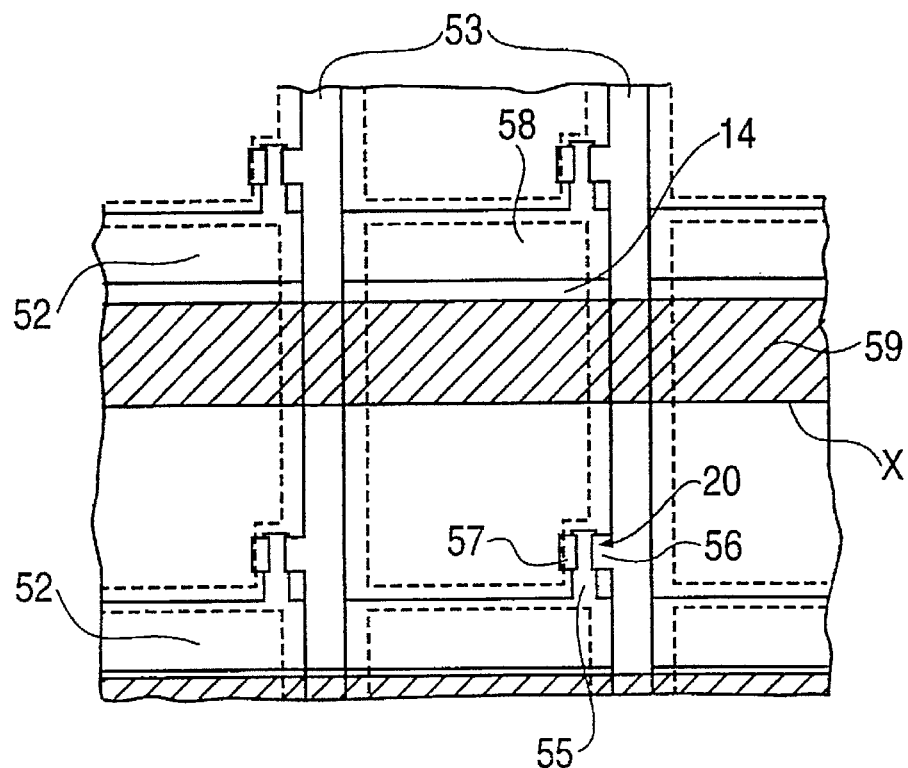
FIG. 18 is a plan view showing another LCD in the ninth example according to the invention.

In this example, the boundary X between the liquid crystal layer regions with different aligning directions is set so as to be parallel to the signal lines 53. This invention is not limited to the specific setting. Alternatively, the boundary X between the liquid crystal layer regions with different aligning directions may be set to be parallel to the scanning lines 52, as is shown in FIG. 18. In such a case, it is possible to eliminate the viewing angle dependence for the above-described reasons.

In this example, a liquid crystal layer region in which aligning directions are different over two or more picture elements while two aligning directions exist in one picture element is formed. This invention is not limited to the specific case. Alternatively, the liquid crystal layer region may be provided in such a manner that aligning directions are different over two or more picture elements while two or three or more aligning directions exist in one picture element.

In addition, it is sufficient for the boundary between the liquid crystal layer regions with different aligning directions to exist over two or more picture elements. Accordingly, it is unnecessary that the boundary continues over all the picture elements in one column among the picture elements disposed in a matrix. In some cases, the boundary may be divided in one column.

Example 10

Another example of the invention will be described.

Figure 19:
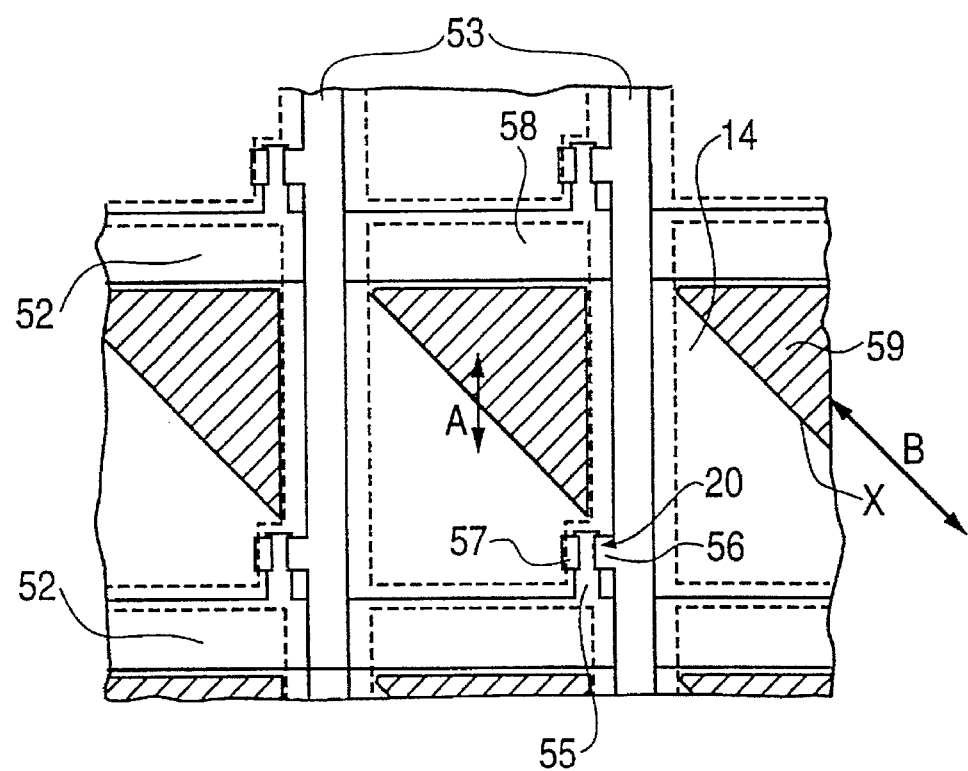
FIG. 19 is a plan view showing an LCD in the tenth example according to the invention.
Figure 20:
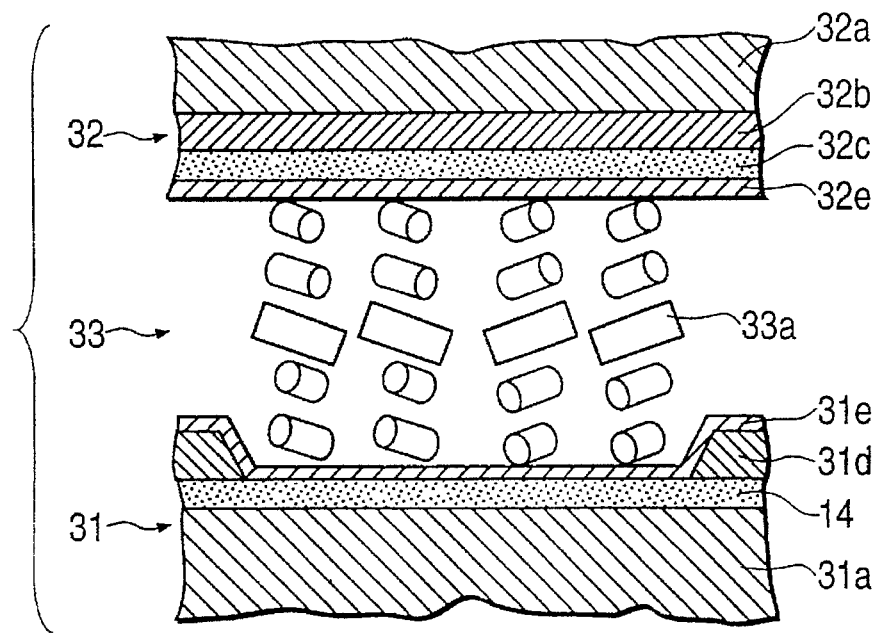
FIG. 20 is a cross-sectional view of the LCD shown in FIG. 19.

FIG. 19 is a plan view showing an LCD of the tenth example. FIG. 20 is a cross-sectional view along the direction a in FIG. 19. Like components are indicated by like reference numerals to those in FIGS. 16 and 17. In this LCD, two liquid crystal layer regions (one is indicated by the reference numeral 59) with different aligning directions are formed so that both regions exist in each picture element. That is, one of the two liquid crystal regions with different aligning directions is shown as a hatched region, and the other region is shown as a region without hatching. Such aligning conditions are formed on the aligning film 31e of the active matrix substrate 31. The two liquid crystal layer regions with different aligning directions are positioned in such a manner that the boundary therebetween is parallel to the aligning direction (the direction B) of the liquid crystal molecules which are in contact with the aligning film 31e of the active matrix substrate 31. In order to realize such aligning conditions, the same aligning treatment as in the above example can be adopted.

As described above, in this LCD, the boundary X between the two liquid crystal layer regions with different aligning directions is parallel to the aligning direction (the direction B) of the liquid crystal molecules which are in contact with the aligning film 31e of the active matrix substrate 31. Accordingly, the disorder of liquid crystal alignment can be suppressed, which results in the above-mentioned occurrence of the disclination line being suppressed. In this example, the above-described aligning conditions are formed on the aligning film 31e of the active matrix substrate 31. Alternatively, the aligning conditions can be formed only on the aligning film 32e of the counter substrate 32, or on both the aligning films 31e and 32e of the substrates 31 and 32. In the former case, it is necessary to set the boundary X to be parallel to the aligning direction of liquid crystal molecules which are in contact with the aligning film 32e of the counter substrate 32. In the latter case, the boundary X may be set so as to be parallel to the aligning direction of liquid crystal molecules which are in contact with either of the aligning film 31e of the active matrix substrate 31 or the aligning film 32e of the counter substrate 32.

Figure 21:
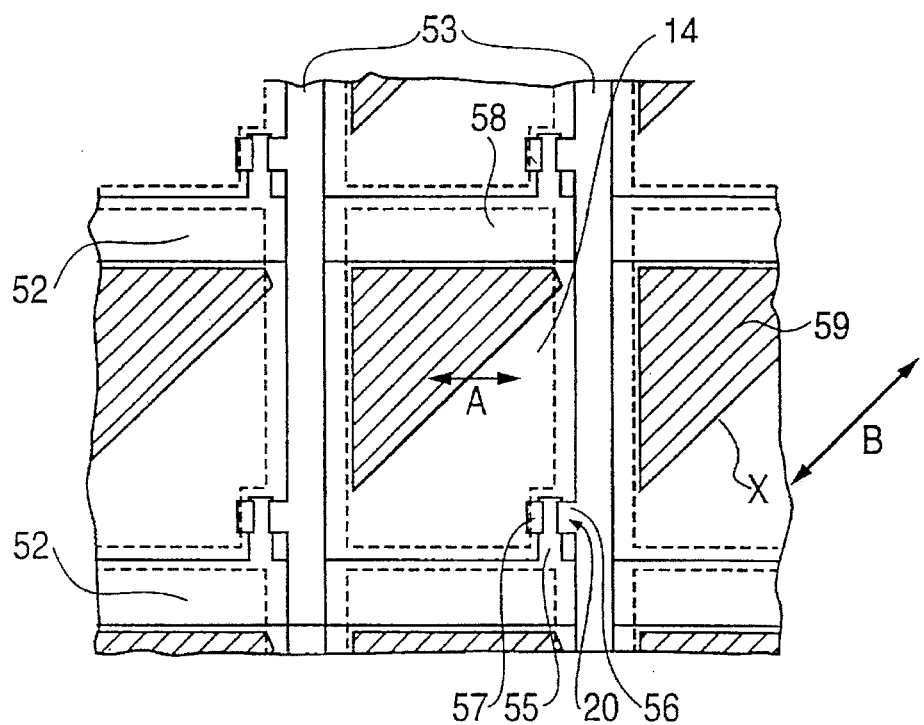
FIG. 21 is a plan view showing another LCD in the tenth example according to the invention.

If the aligning direction (the direction B) is different from that in the above-described case, as is shown in FIG. 21, the two liquid crystal layer regions with different aligning directions may be formed so that the boundary X therebetween is set to be parallel to the aligning direction.

In the above cases, as is shown in FIGS. 19 and 21, the boundary X is formed from one of the horizontally adjacent sides to the other, or from one of the vertically adjacent sides to the other sides of the display panel of the LCD. The invention is not limited to the specific patterns. The boundary X extending from one side does not necessarily reach the other side. Alternatively, the boundary X may divide each side.

Figure 22:
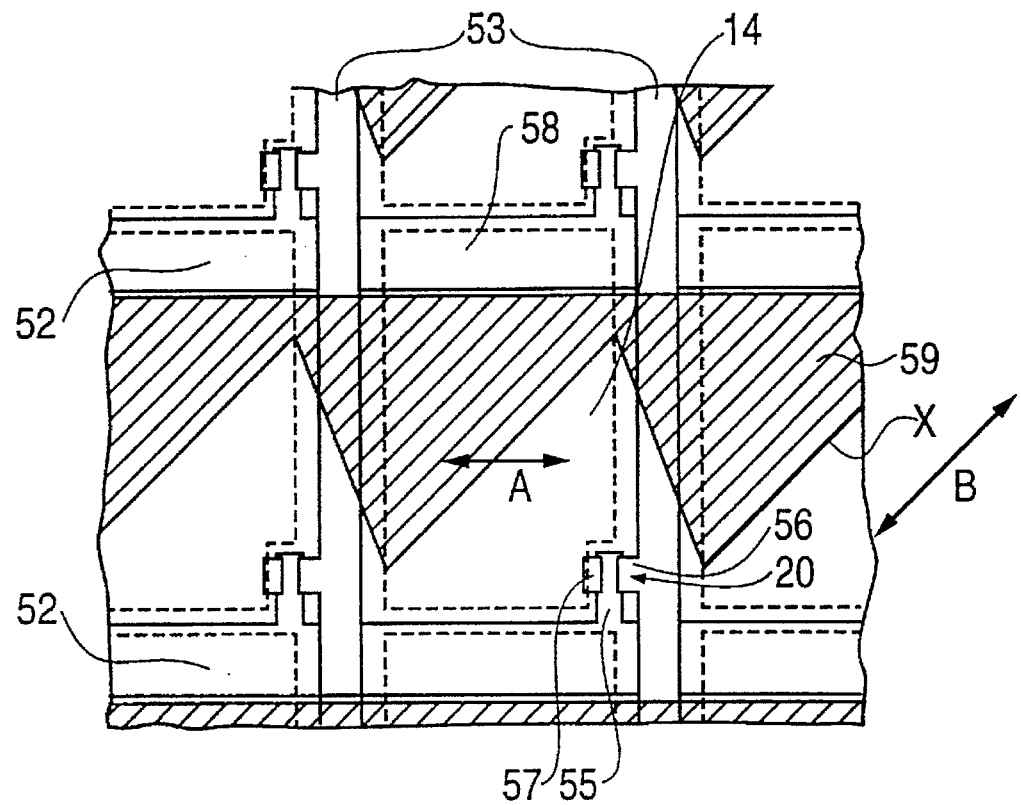
FIG. 22 is a plan view showing still another LCD in the tenth example according to the invention.

In addition, the two liquid crystal layer regions with different aligning directions are formed in each separate picture element. The invention is not limited to this specific case. Alternatively, as is shown in FIG. 22, the two liquid crystal layer regions may be formed over successive picture elements. In such a case, on a portion corresponding to the picture element, the boundary X between the two liquid crystal layer regions with different aligning directions should be set so as to be parallel to the aligning direction (the direction B). In other words, portions other than picture elements hardly affect the aligning direction of liquid crystal molecules during the display, so that the boundary X between the two liquid crystal layer regions with different aligning directions in the portions other than the picture elements is not necessarily parallel to the aligning direction (the direction B) of the liquid crystal molecules. In order to realize such aligning conditions, the same treatment as in the previous example can be adopted.

Moreover, as is shown in FIG. 21, in the case of the active matrix type LCD having the TFT 20 of a nonlinear element between the picture element and the signal line, if the boundary X between the two liquid crystal layer regions with different aligning directions is positioned farthest from the nonlinear element, it is possible to prevent the deterioration of the nonlinear element during the treatment for making the surface rough.

In Example 10, it is appreciated that three or more liquid crystal layer regions with different aligning directions are formed in one picture element, and the respective boundaries are set so as to be parallel to the aligning direction of liquid crystal molecules.

Example 11

In this example, two or more regions with different aligning directions are formed, and a light blocking film is formed on each boundary, so that the light leaked from the boundary portion is blocked by the light blocking film. In this case, it is unnecessary to set the boundary to be parallel to the aligning direction of the liquid crystal molecules.

Figure 23:
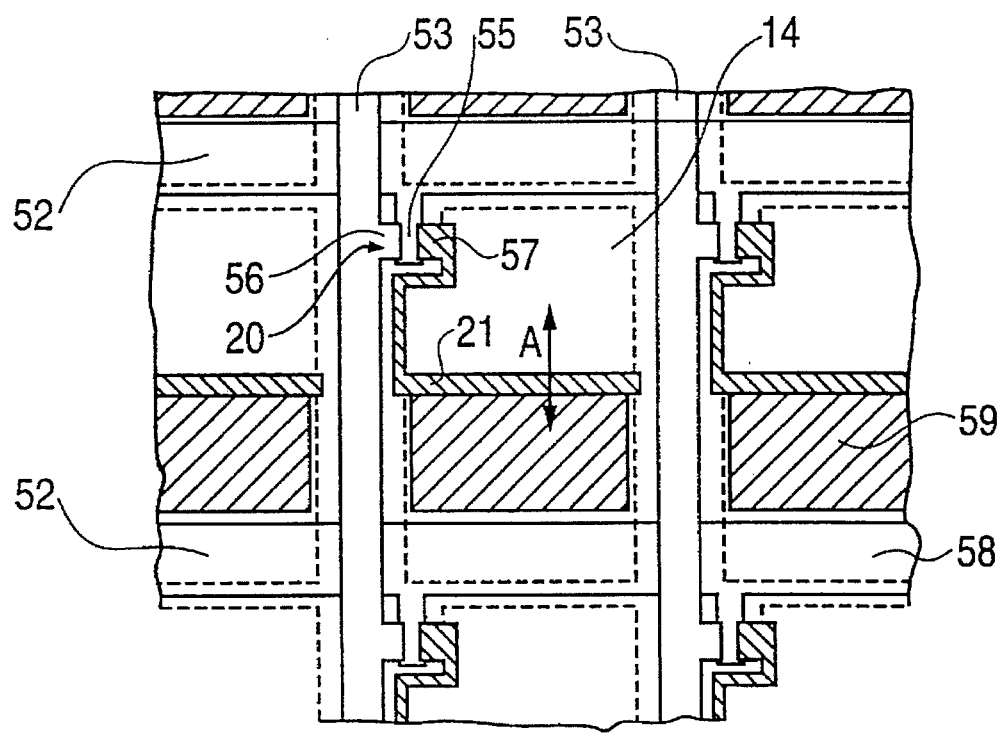
FIG. 23 is a plan view showing an LCD in the eleventh example according to the invention.
Figure 24:
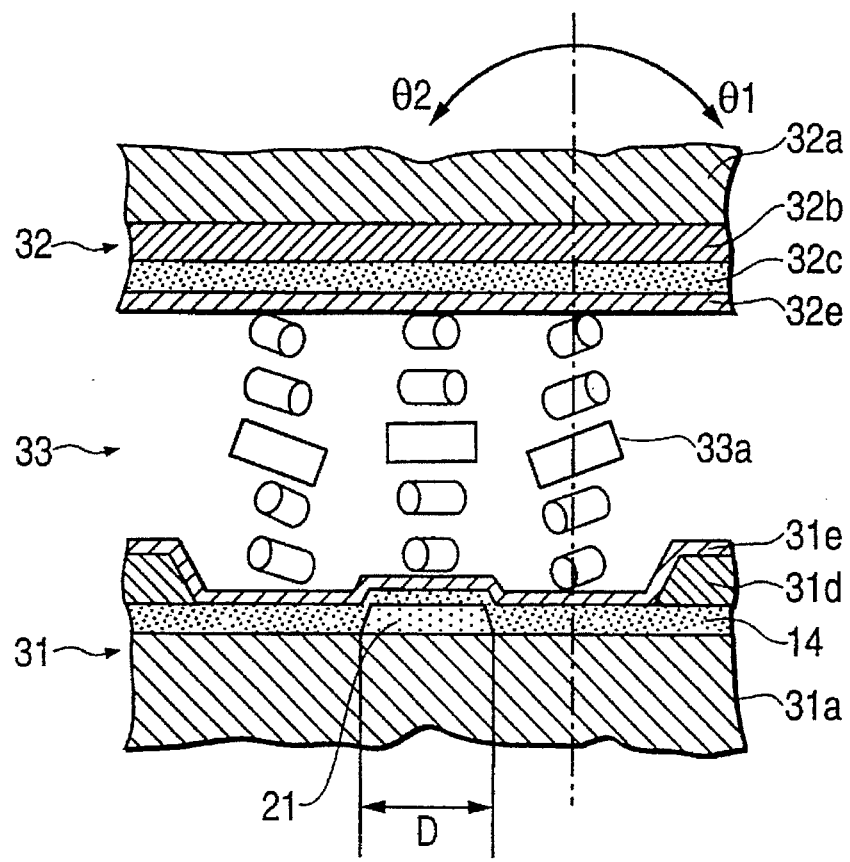
FIG. 24 is a cross-sectional view of the LCD shown in FIG. 23.

FIG. 23 is a plan view showing an LCD of this example, and FIG. 24 is a cross-sectional view thereof. In this LCD, the boundary between two liquid crystal layer regions with different aligning directions (one is indicated by the reference numeral 59) is covered with a light blocking film 21 which is extended from the drain electrode 57.

Accordingly, in this example, the light leaked from the boundary portion in which any disclination line occurs can be blocked by the light blocking film 21, so that the contrast can be enhanced. The light blocking film is formed of the same material as that of the drain electrode 57 constituting the TFT 20 because the attaching accuracy of the two substrates is low. If the light blocking film 21 is separately formed, a positioning deviation occurs between the light blocking film 21 and the TFT 20 both of which have the light blocking function after the attachment of the substrates. As a result, the opening ratio is reduced. On the contrary, if the light blocking film 21 is formed of the same material as the drain electrode 57, the deposition and etching for the drain electrode 57 can be used for the formation of the light blocking film 21. Thus, the number of process steps is not increased as compared with the conventional process.

As shown in FIG. 24, the width D of the light blocking film 21 may be set to be a value with which the light blocking film 21 can block the light leaked from the portion in which the disclination line occurs.

In this example, the light blocking film 21 is formed of the same material as that of the drain electrode 57. Alternatively, the light blocking film 21 may be formed of the same material as any electrode or the like having the light blocking function constituting the TFT 20. In such a case, the same effects can be attained.

Figure 25:
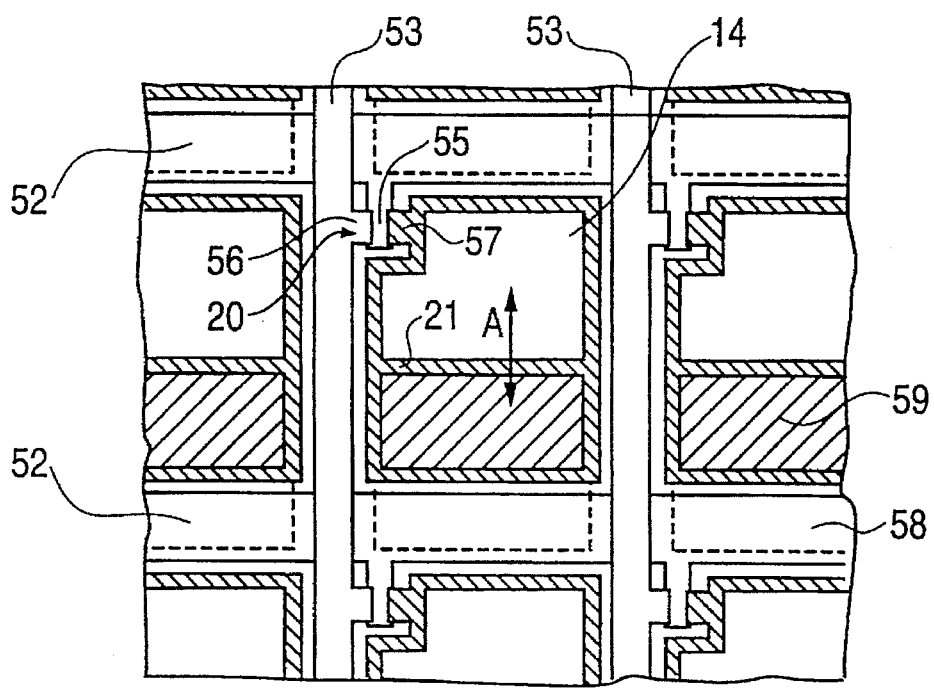
FIG. 25 is a plan view showing another LCD in the eleventh example according to the invention.
Figure 26:
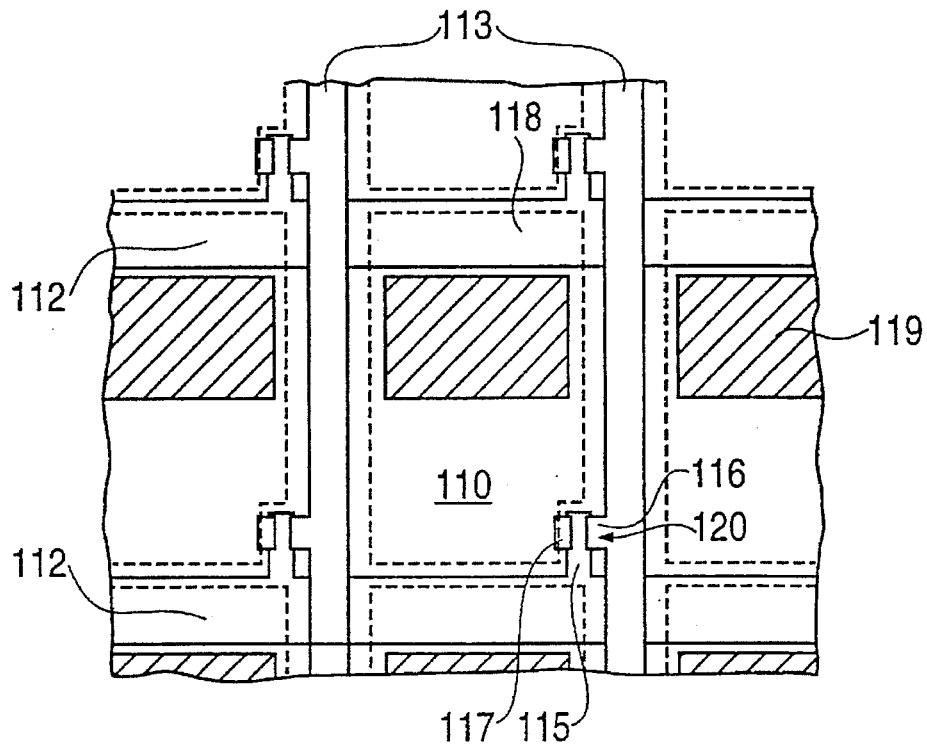
FIG. 26 is a plan view showing a conventional LCD.
Figure 27:
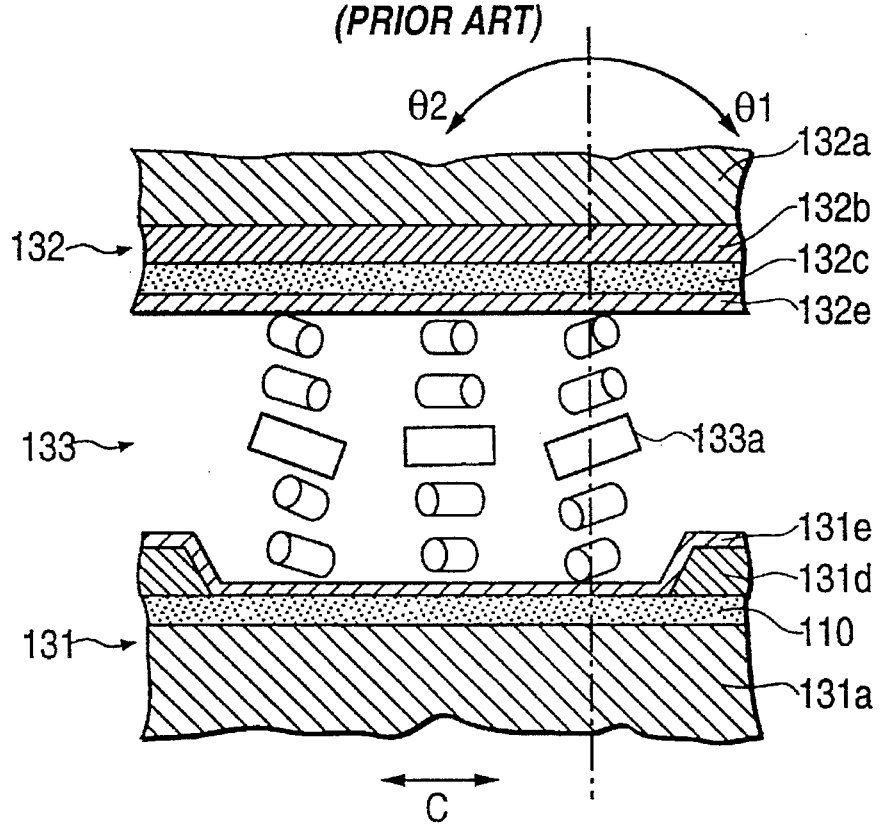
FIG. 27 is a cross-sectional view of the conventional LCD shown in FIG. 26.
Figure 28:
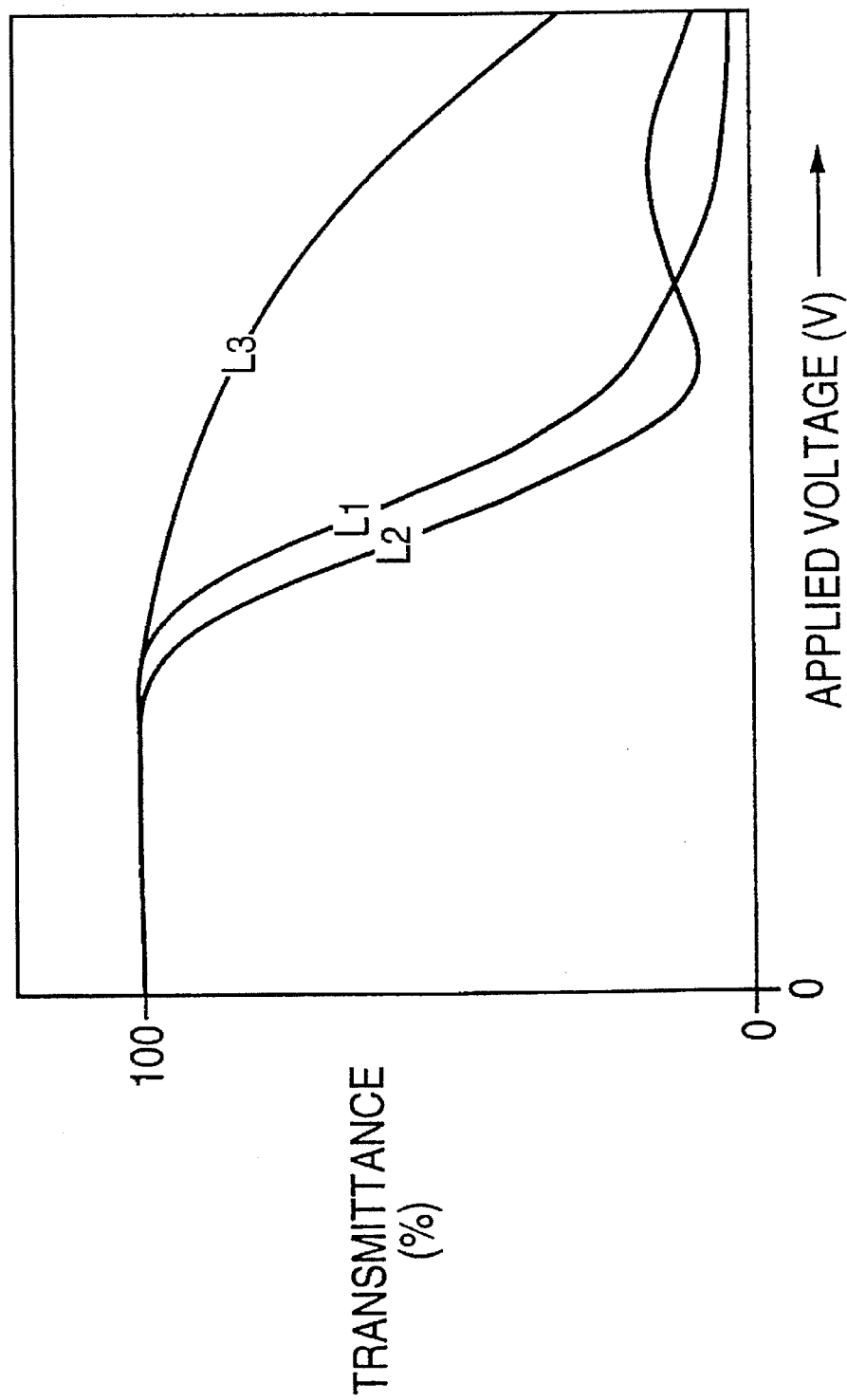
FIG. 28 is a diagram illustrating the applied voltage to transmittance characteristics in a conventional normally white mode LCD.
Figure 29A:
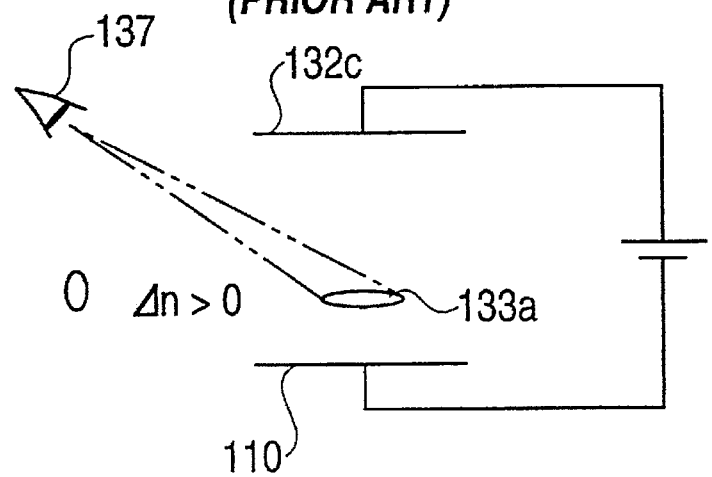
FIGS. 29(a) to 29(c) are diagrams illustrating the reverse phenomenon in the LCD.
Figure 29B:
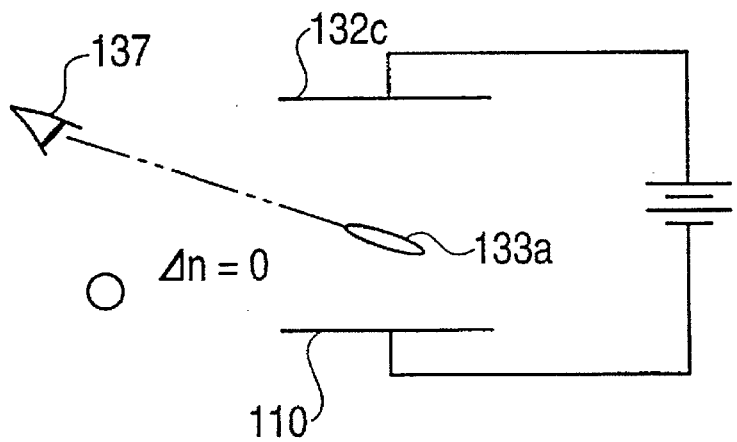
Figure 29C:
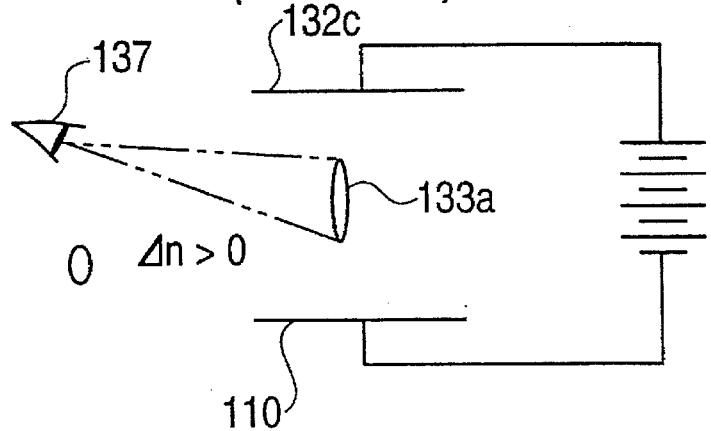
Figure 30A:
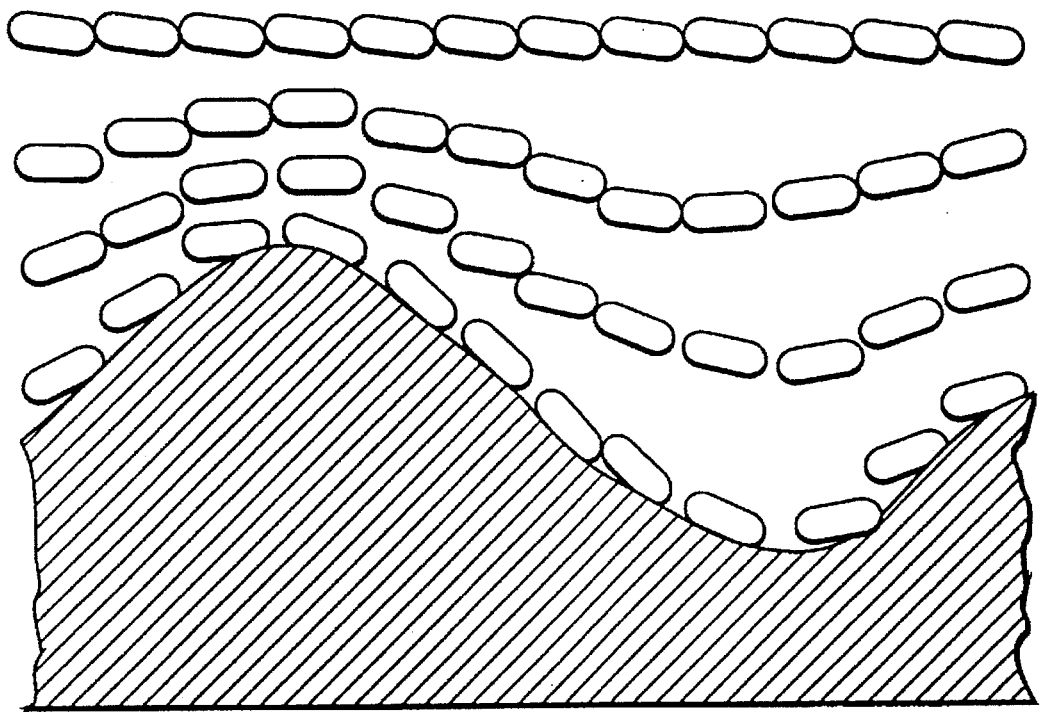
FIGS. 30(a) and 30(b) are schematic diagrams showing the degrees of roughness of the aligning film surface, and the influence of the roughness on the pretilt angles of the liquid crystal layer.
Figure 30B:
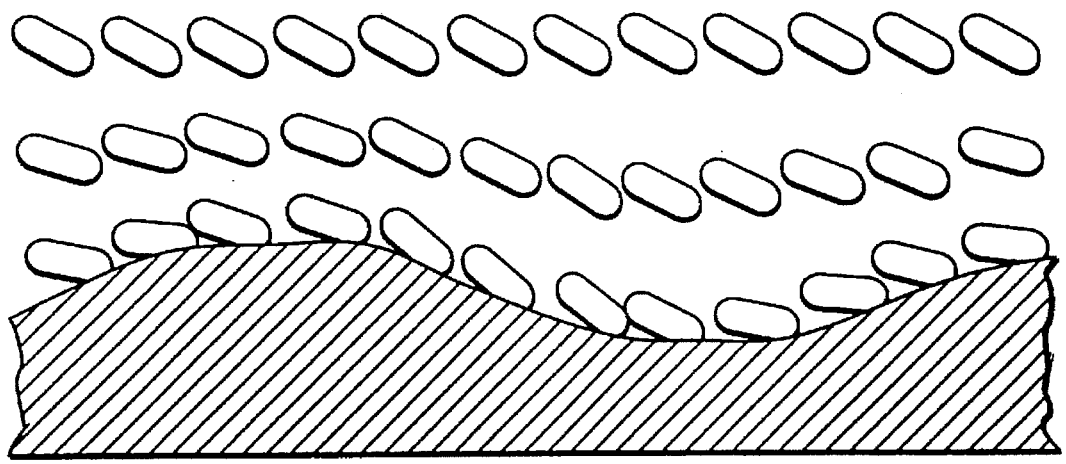

The light blocking film 21 in this example can be formed so as to cover the entire peripheral portions of the picture elements, as is shown in FIG. 25. Alternatively, the light blocking film 21 may be formed so as to cover the boundary X shown in Examples 9 and 10.

The techniques described in Examples 9, 10, and 11 can also be applied to Examples 1 to 8. Other than the LCDs of above-mentioned modes and structures, the present invention is applicable to any LCD of a desired mode and a desired structure.

As is apparent from the above-described examples, according to the invention, the aligning conditions of liquid crystal molecules can be controlled so as to be different from each other in one and the same crystal cell, so that the change in refractive index generated in the thickness direction of the liquid crystal cell can be made small. Accordingly, the reverse phenomenon, the degradation of contrast, and the like in the LCD can be eliminated. According to the invention, it is unnecessary to change the electrode pattern as in the conventional improving method, so that the viewing angle characteristics can be improved by a simple production method at a low cost. Thus, the driving method for the LCD is not complicated. Therefore, it is possible to provide an LCD capable of performing a display with high contrast and high quality.

According to the invention, the viewing angle dependence of the LCD can be eliminated, and the disadvantageous phenomenon that one aligning condition is absorbed by another aligning condition can be suppressed. In addition, the occurrence of disclination line at the boundary between regions with different aligning directions can be suppressed. Moreover, in the case where the light blocking film is formed, the light leaked from the disclination line, if any, can be blocked. Therefore, according to the invention, it is possible to provide an LCD with an enhanced display quality.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for producing a liquid crystal display apparatus having a pair of substrates with a liquid crystal layer interposed therebetween and having picture elements disposed in a matrix, the method comprising the steps of:

forming an aligning film on at least one of the pair of substrates, wherein liquid crystal molecules in the liquid crystal layer adjacent the aligning film are at a pretilt angle with respect to the aligning film;

performing a first surface treatment on the aligning film for aligning the liquid crystal molecules adjacent the aligning film; and performing a second surface treatment for making at least a part of a surface of the aligning film rough to adjust the pretilt angle of the liquid crystal molecules adjacent the aligning film.

2. A method for producing a liquid crystal display apparatus according to claim 1, wherein the second surface treatment is performed with respect to at least one selected picture element.

3. A method for producing a liquid crystal display apparatus according to claim 1, wherein the second surface treatment creates different degrees of roughness for the picture elements.

4. A method for producing a liquid crystal display apparatus according to claim 1, wherein the second surface treatment is performed with respect to a plurality of selected portions in each of the picture elements.

5. A method for producing a liquid crystal display apparatus according to claim 1, wherein the second surface treatment creates a plurality of selected portions in each of the picture elements.

6. A method for producing a liquid crystal display apparatus according to claim 1, wherein the second surface treatment is performed by contacting the surface of the aligning film with a solution containing one of an acid or alkali as a main component.

7. A method for producing a liquid crystal display apparatus according to claim 1, wherein the second surface treatment is performed by contacting the surface of the aligning film with one of a reaction gas or a gas in a plasma phase.

8. A method for producing a liquid crystal display apparatus according to claim 1, wherein the roughness of the surface of the aligning film is formed on the order of nanometers.

9. A method for producing a liquid crystal display apparatus having a pair of substrates with a liquid crystal layer interposed therebetween and having picture elements disposed in a matrix, the method comprising the steps of:

forming an underlying film on at least one of the pair of substrates;

making the surface of the underlying film rough;

forming an aligning film, liquid crystal molecules in the liquid crystal layer adjacent the aligning film being at a pretilt angle with respect to the aligning film; and performing a treatment on the surface of the aligning film for aligning the liquid crystal molecules adjacent the aligning film, wherein the roughness of the surface of the underlying film is transferred to the aligning film, and the pretilt angle of the liquid crystal molecules is adjusted depending on the transferred roughness.

10. A method for producing a liquid crystal display apparatus according to claim 9, wherein the step of making the underlying film rough includes the substeps of:

making at least a first portion of the surface of the underlying film rough;

selectively forming a resist pattern on the first portion of the underlying film, making a second portion of the surface of the underlying film rough, the second portion being a portion of the underlying film on which the resist pattern is not formed; and removing the resist pattern from the underlying film.

11. A method for producing a liquid crystal display apparatus according to claim 9, wherein the underlying film is formed to include a first portion made of a first material and a second portion made of a second material, different from the first material, and the step of making the underlying film rough includes a step of making the surface of the first portion and the surface of the second portion of different roughness from each other.

12. A method for producing a liquid crystal display apparatus according to claim 9, wherein the step of making the underlying film rough is performed with respect to at least one selected picture element.

13. A method for producing a liquid crystal display apparatus according to claim 9, wherein the step of making the underlying film rough is performed with respect to at least a selected one of a plurality of portions in each of the picture elements.

14. A method for producing a liquid crystal display apparatus according to claim 9, wherein each of the picture elements includes a plurality of portions having different degrees of roughness.

15. A method for producing a liquid crystal display apparatus according to claim 9, wherein the aligning film is made of an organic polymer.

16. A method for producing a liquid crystal display apparatus according to claim 15, wherein the organic polymer film includes a material containing polyimide, polyamide, polystyrene, polyamideimide, epoxyacrylate, spiranacrylate, or polyurethane as a main component.

17. A method for producing a liquid crystal display apparatus according to claim 9, further including a step of selectively forming an insulating film on the underlying film whose surface is made rough, thereby making the surface of the insulating film rough in accordance with the roughness of the surface of the underlying film, wherein the aligning film is formed to cover the underlying film and the insulating film so that the roughness of the surface of the insulating film is transmitted to the surface of the aligning film in addition to the roughness of the surface of the underlying film.

18. A method for producing a liquid crystal display apparatus according to claim 17, wherein the surface of the aligning film is made rough depending on the roughness of the surface of the underlying film, the roughness of the insulating film and the presence of the insulating film.

19. A method for producing a liquid crystal display apparatus according to claim 9, wherein the degree of roughness of some of the picture elements is different from the degree of roughness of the other of the picture elements.

20. A method for producing a liquid crystal display apparatus according to claim 9, wherein the roughness of the surface of the aligning film is formed on the order of nanometers.

* * * * *